(12) United States Patent
Zito et al.

(10) Patent No.: US 8,566,202 B2
(45) Date of Patent: Oct. 22, 2013

(54) DESKTOP EXTENSION FOR READILY-SHARABLE AND ACCESSIBLE MEDIA PLAYLIST AND MEDIA

(75) Inventors: Anthony Zito, Draper, UT (US);
Brandon Hoff, Salt Lake City, UT (US);
Scott C. Lemon, Heber City, UT (US)

(73) Assignee: Media Forum, Inc., Midvale, UT (US)

( * ) Notice: Subject to any disclaimer, the term of this patent is extended or adjusted under 35 U.S.C. 154(b) by 0 days.

(21) Appl. No.: 13/600,073

(22) Filed: Aug. 30, 2012
(Under 37 CFR 1.47)

(65) Prior Publication Data
US 2013/0061131 A1 Mar. 7, 2013

Related U.S. Application Data

(62) Division of application No. 12/034,405, filed on Feb. 20, 2008, now Pat. No. 8,275,681.

(60) Provisional application No. 60/943,515, filed on Jun. 12, 2007.

(51) Int. Cl.
*G06F 15/16* (2006.01)

(52) U.S. Cl.
USPC ............................................ 705/35; 709/231

(58) Field of Classification Search
USPC ........................................................ 709/231
See application file for complete search history.

(56) References Cited

U.S. PATENT DOCUMENTS

| | | | |
|---|---|---|---|
| 7,483,958 B1 * | 1/2009 | Elabbady et al. | 709/217 |
| 7,870,282 B2 * | 1/2011 | Jonsson et al. | 709/231 |
| 2003/0225834 A1 * | 12/2003 | Lee et al. | 709/204 |
| 2005/0166136 A1 * | 7/2005 | Capps et al. | 715/500.1 |
| 2005/0251807 A1 * | 11/2005 | Weel | 719/310 |
| 2007/0101008 A1 * | 5/2007 | Gomez | 709/228 |
| 2007/0239883 A1 * | 10/2007 | Glenn | 709/231 |
| 2008/0162668 A1 * | 7/2008 | Miller | 709/219 |

OTHER PUBLICATIONS

Share videos online with YouTube Computer Active. London: Oct. 26, 2006. , Iss. 227.*

* cited by examiner

*Primary Examiner* — William Rankins
(74) *Attorney, Agent, or Firm* — Kirton McConkie; Michael F. Krieger

(57) ABSTRACT

A system and method for distributing and providing access to media and for extending such access to a desktop environment is described. A media player in a webpage or in a desktop environment may reference a centralized location to access a playlist of media files. The playlist itself may reference remotely-located media files that may be streamed to the media player. The media player may be distributed in multiple environments, and updates to the playlist may be automatically distributed to all instances where the playlist is referenced due to the centralized reference in the media player. The embodiments of the media player may also be used in advertising as a mechanism for increasing user contact with an advertising entity and as a mechanism for distributing announcements and information by the advertiser.

20 Claims, 29 Drawing Sheets

DESKTOP EXTENSION FOR READILY-SHARABLE AND ACCESSIBLE MEDIA PLAYLIST AND MEDIA

CROSS-REFERENCE TO RELATED APPLICATIONS

This application is a divisional application of prior application Ser. No. 12/034,405, filed Feb. 20, 2008 now U.S. Pat. No. 8,275,681, which claims the benefit of U.S. Provisional Application No. 60/943,515, filed Jun. 12, 2007.

BACKGROUND OF THE INVENTION

1. Field of the Invention

The present invention relates to the distribution and playing of media, and more particularly to flexible methods of providing access to media, media playlists, and media-based advertisements at multiple locations and methods of easily spreading such media, media playlists, and media-based advertisements to various locations over the Internet or a similar network and through and to users' computer desktops.

2. Background and Related Art

One increasingly-important use of the Internet has been the playing and sharing of media files. This has become popular and important, in part, due to the increasing number of users having high-speed connections to the Internet. These users are now able to access large media files, including songs, movies, pictures, etc., and are increasingly desirous to receive much of their media through the Internet. Additionally, many users now store their media on the Internet instead of locally, to improve access for themselves and others. However, limitations on the delivery of media through the Internet are readily apparent.

For example, in many instances, the delivery of media is limited by its location: individuals must seek out media in which they are interested, and must navigate to the particular location (such as a website) where that media is stored. Sharing media may be cumbersome, as large media files take up large amounts of space on multiple servers each time the media is shared with another location. Additionally, once media is stored in a particular location, it typically must be accessed by returning to the original storage location. This requires additional navigational steps that make media retrieval cumbersome for some users.

BRIEF SUMMARY OF THE INVENTION

Embodiments of the invention overcome many of these limitations. The embodiments provide for the insertion of a media player with access to media and a media playlist into any standard webpage, or portion thereof, such as a portion of a personal, social, or networking webpage (such as MySpace® pages provided by Myspace Incorporated, for example). The media player having access to media and the media playlist may be customized to a user's preferences, and may include links to remotely-hosted media of any type to be displayed through the media player. The media player itself may rely on a commonly-accepted and readily-available media player standard or media-distribution platform, such as Flash® and AIR®, provided by Adobe Systems Incorporated.

When the media player is embedded on a webpage, it may be embedded as hypertext markup language (HTML) text (or a similar code) referencing information from a service provider's webpage where the media player information, media information, and media playlist information (including the linking information to the actual media) may be stored. Multiple instances of the media player inserted into different webpages may therefore reference the same media and media playlist information, allowing identical media players, media, and media playlists to be inserted in multiple webpages without requiring an additional full copy of the media player, media, or media playlist to be inserted into the webpages. The media player may be displayed as a part of the webpage in which it is inserted by any compatible web browser.

Because the media player, media playlist information, and media may be centrally located and accessed, several unique advantages may be provided by the embodiments of the invention. A user may log in to any instance of the media player, regardless of whether the media and media playlist displayed by the instance of the media player is authored by or owned by the user or by someone else. Upon logging in to the media player, the user may then edit and/or play his or her own playlist without ever leaving the web page where login occurred. Therefore, to play and/or edit a user's own media and media playlist, the user need not navigate to a webpage having an instance of that user's media and media playlist. Upon the user logging out after finishing updating and/or playing a portion of his or her media and/or media playlist, the media player in the webpage being visited returns to the playlist it displayed before (unless it has been edited by the user or by someone else in the meantime).

Additionally, the webpage, media player, and playlist displayed on the webpage need not be affected for other viewers by the user logging in to the media player at his or her computer. Though the media player changes to display his or her playlist, others accessing the webpage will continue to be able to view the playlist normally displayed at that page.

Because an instance of the media player is represented on a webpage by simple HTML language (or similar code) referencing a remotely-hosted media player, media playlist, and media, multiple instances of the same media and media playlist may be readily inserted into multiple webpages without requiring large amounts of storage space. Additionally, instances of the same media and media playlist may be easily shared by providing the HTML language to be copied and inserted in other pages. This can be accomplished by providing the HTML language at a particular instance of the media player, by e-mail, or by any number of other methods. Thus, popular playlists may be shared and distributed widely in a quasi-viral and exponential fashion.

The actual media played by the media player may be accessed by merely providing a link to a web-accessible location hosting the media. Therefore, each instance of the media player need not have local access to the media, but may access a single remote copy of the media. This further facilitates the ability to spread media players, media playlists, and media to multiple locations and to easily share media and media playlists. The embodiments of the invention may provide tracking of the spread and use of the media player and playlist instances for various purposes. In some embodiments, the media and/or media playlists may be further shared by permitting limited or unlimited transfer or copying of the media contained in the media playlists or the media playlists themselves (and corresponding links to remotely-hosted media) displayed by the media player.

In some embodiments, the media player and/or media playlists may be accessed and/or distributed through banner advertisements (e.g. online display advertisements) and other similar webpage items. In some such embodiments, a mouse-over or mouse-click event may activate or increase functionality of the media player and/or media playlists. Additionally, in some embodiments, a desktop-based extension of the media player may be obtained as a stand-alone program/application or as a desktop widget configured to run on a third-party platform or runtime that permits extension of the Internet-based media player to a user's desktop. In this and similar ways, an advertiser or other media owner may increase contact and interaction with a user even outside of the Internet context. The embodiments of the invention will be described in more detail below with reference to the Figures.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
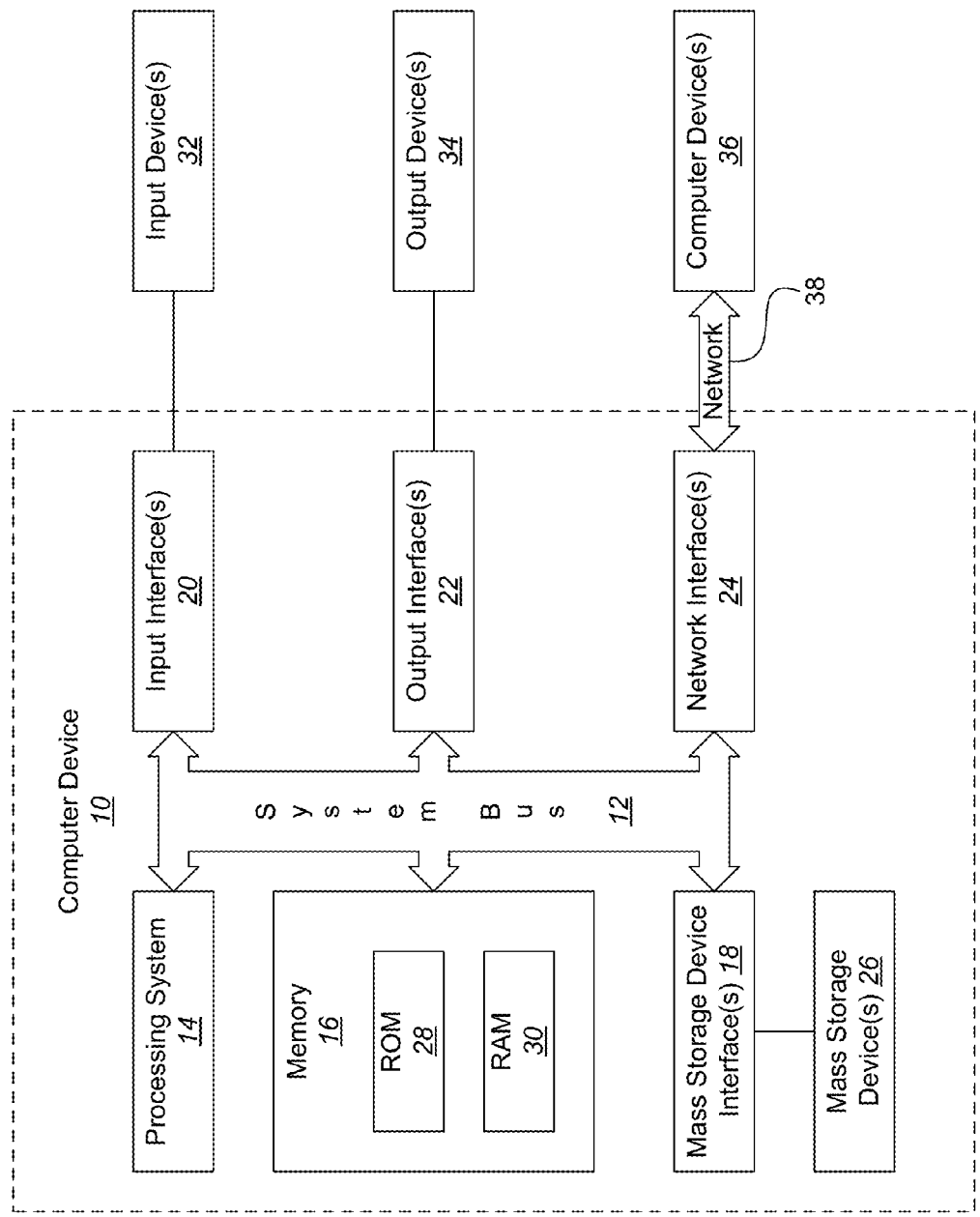
FIG. 1 shows a representative computer system suitable for use with embodiments of the present invention.

A description of the embodiments of the present invention will be given with reference to the Figures. It is expected that the present invention may take many other forms and shapes, hence the following disclosure is intended to be illustrative and not limiting, and the scope of the invention should be determined by reference to the appended claims.

In the specification and in the claims, the following terms shall be construed according to the following:

"Media," except as explicitly limited herein, shall include any audio, visual, or audio-visual media and mechanisms for communicating information, including sounds, songs, still pictures, moving images, illustrations, movies, movie clips, text, advertisements, promotions, product offers, notifications and alerts of changes, promotions, product offers, etc.

A "media player," except as explicitly limited herein, shall include any device, program, application, widget, plug-in, advertisement, or display mechanism for displaying or communicating media, as described above and herein.

Embodiments of the invention provide for the insertion of a media player having a media playlist and media into any standard webpage, or portion thereof, such as a portion of a personal, social, or networking webpage (such as MySpace® pages provided by Myspace Incorporated of Santa Monica, Calif.). The media player, media, and media playlist may be customized to a user's preferences, and may include links to remotely-hosted media of any type to be displayed through the media player. Examples of media that may be played or displayed by the media player include video media, audio media, pictures, text, slideshows, etc. The media player itself may rely on a commonly-accepted and readily-available media player standard, such as Flash®, provided by Adobe Systems Incorporated of San Jose, Calif. Thus, the media player may be what is known in the art as a Flash®-based widget. When the media player is embedded on a webpage, however, it may be embedded as hypertext markup language (HTML) text (or a similar code) referencing information from a service provider's webpage where the media player information, media playlist information (including any linking information to the actual media), and even the media may be stored. Multiple instances of the media player inserted into different webpages may therefore reference the same media playlist information, allowing identical media and media playlists to be inserted in multiple webpages. The media player may be displayed as a part of the webpage in which it is inserted by any compatible web browser.

Because the media and media playlist information may be centrally located and accessed, several unique advantages may be provided by the embodiments of the invention. A user my log in to any instance of the media player, regardless of whether the media and media playlist displayed by the media player is authored by and owned by the user or by someone else. Upon logging in to the media player, the user may then edit and/or play his or her own media and media playlist without ever leaving the web page where login occurred. Therefore, to play and/or edit a user's own media and media playlist, the user need not navigate to a webpage having an instance of that user's media and media playlist. Upon the user logging out after finishing updating and/or playing a portion of his or her media and media playlist, the media player in the webpage being visited returns to the playlist it displayed before (unless it has been edited by the user or by someone else in the meantime).

Additionally, the webpage, media player, media, and media playlist displayed on the webpage are not affected for other viewers of the webpage by the user logging in to the media player at his or her computer. Though the media player changes to display the user's media and media playlist on the computer being used by the user, others accessing the webpage will continue to be able to view the media and media playlist normally displayed at that page.

Furthermore, in some embodiments, a user navigating the web and encountering a media player with associated media and media playlist may desire to acquire either the media itself or the media playlist (and links to remotely-hosted media) for use by the user. In some embodiments, a user may be permitted limited or unlimited access to media and media playlists at others' instances of the media player and may copy media and/or media playlists to locations controlled by the user, and may further incorporate the media and/or media playlist information in the user's own media library, media playlist, and instances of the media player.

Because an instance of the playlist may be represented on a webpage by simple HTML language (or similar code) referencing a remotely-hosted media playlist, remotely-hosted media, and a remotely-hosted Flash®-based widget media player, multiple instances of the same media and media playlist may be inserted into multiple webpages. Additionally, instances of the same media and media playlist may be easily shared by providing the HTML language to be copied and inserted in other pages. This can be accomplished by providing the HTML language at a particular instance of the media player, by e-mail, or by any number of other methods. Thus, popular playlists may be shared and distributed widely in a quasi-viral and exponential fashion.

The actual media played by the media player may be accessed by merely providing a link to a web location hosting the media. Therefore, each instance of the media player need not have local access to the media, but may access a single remote copy of the media. This further facilitates the ability to spread media and media playlists to multiple locations and to easily share media and media playlists. The embodiments of the invention may provide tracking of the spread and use of the media player and media playlist instances for various purposes. The embodiments of the invention will be described in more detail below with reference to the Figures.

Figure 2:
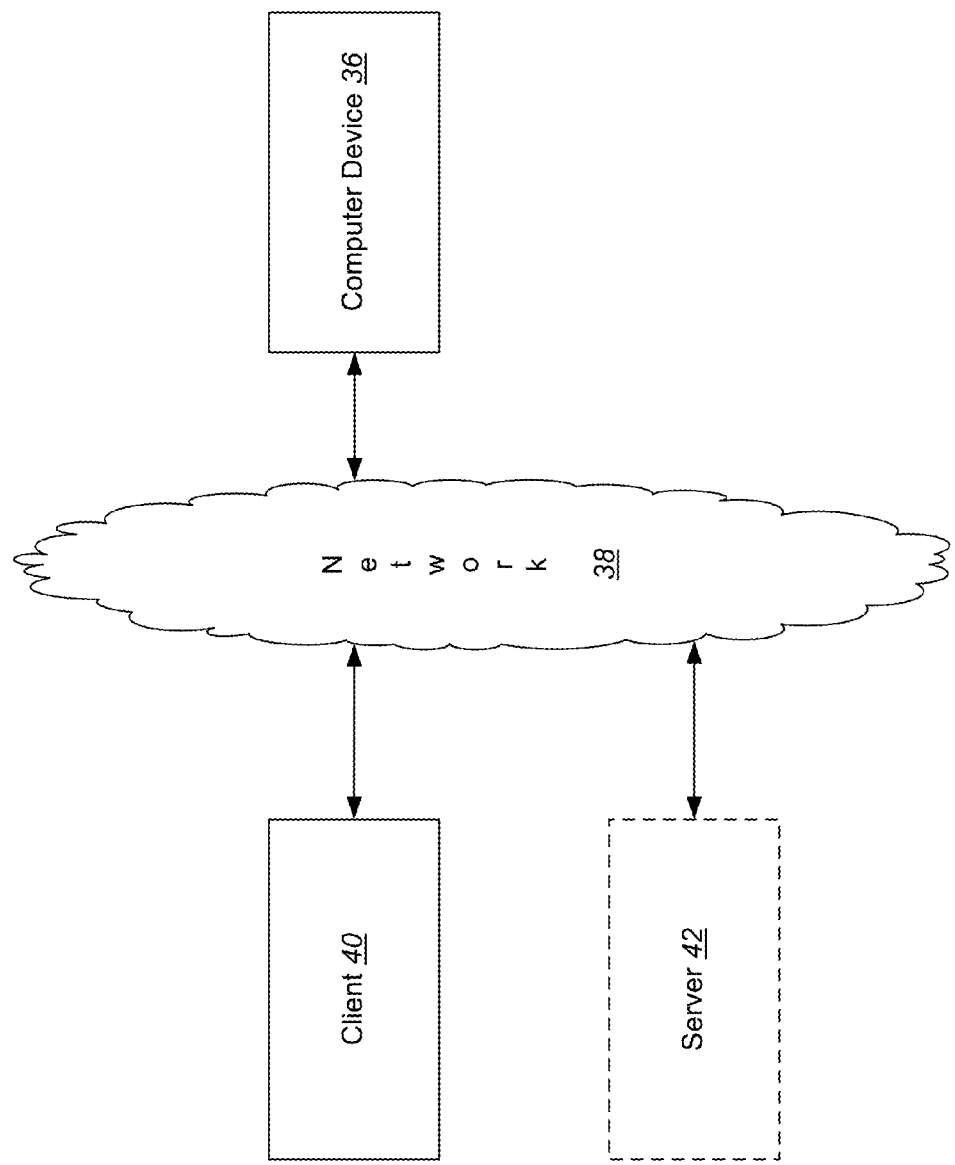
FIG. 2 shows a networked system configuration suitable for use with embodiments of the invention.

Inasmuch as at least some embodiments of the present invention embrace utilization of a computer device, FIGS. 1 and 2 and the corresponding discussion are intended to provide a general description of some suitable operating environments in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), non-volatile random-access memory ("NVRAM"), read-only memory ("ROM"), programmable read-only memory ("PROM"), erasable programmable read-only memory ("EPROM"), electrically erasable programmable read-only memory ("EEPROM"), flash memory (e.g., a USB thumb-drive), compact disk read-only memory ("CD-ROM"), magnetic memory (e.g., a hard drive), or any other device or component that is capable of providing data or executable instructions that may be accessed by a processing system. With reference to FIG. 1, a representative system for implementing the invention includes computer device 10, which may be a general-purpose or special-purpose computer. For example, computer device 10 may be a personal computer, a notebook computer, a personal digital assistant ("PDA"), cellular camera phone, digital camera or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, a flash memory device, or from a communication connection, which may also be viewed as a computer readable medium.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives, flash memory devices, and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

Memory 16 may include one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, a bioreader sensor, and the like. Similarly, examples of input interfaces 20 that may be used to connect the input devices 32 to the system bus 12 include a serial port, a parallel port, a game port, a universal serial bus ("USB"), IEEE 1394, IrDA, Bluetooth, Wi-Fi, Wi-MAX or another interface.

One or more output interfaces 22 may be employed to connect one or more corresponding output devices 34 to system bus 12. Examples of output devices 34 include a monitor or display screen, a printer, a plotter, a multi-function device, or other output device. A particular output device 34 may be integrated with or peripheral to computer device 10. Examples of output interfaces 22 include a video adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces 24 include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

While those skilled in the art will appreciate that embodiments of the present invention may be practiced in a variety of different environments with many types of computer system configurations, FIG. 2 represents a representative networked system configuration that may be used in association with an embodiment of the present invention. While FIG. 2 illustrates an embodiment that includes a client computer 40, another computer device 36, and a server 42 connected to a network 38, alternative embodiments include more than one client computer 40, no server 42, and/or more than one server 42 connected to the network 38. Moreover, embodiments in accordance with the present invention also include wireless networked environments, or where the network 38 is a wide area network, such as the Internet. In some embodiments, the client 40 is at least intermittently connected to a wide area network 38, such as the Internet, or intermittently directly connected to another computer device so connected to facilitate access to media through the network 38.

Some embodiments of the invention include the use of a web-browser-compatible media player, such as the Flash® Player by Adobe Systems Incorporated, which is favorable as a media delivery platform due to its ubiquitous nature. Other media players or media delivery systems may also be used in accordance with embodiments of the invention, including media players embedded in webpages, media players included with web browsers, and other media players. The media content that can be delivered through the various media players may include all types of media or multimedia content such as videos, slide shows with sound, picture-only slide shows, audio files, songs, text, pictures, games, etc. It is envisioned that any type of media that may be delivered through wide-area networks 38, such as the Internet, may be delivered through embodiments of the invention, including interactive media.

Figure 3:
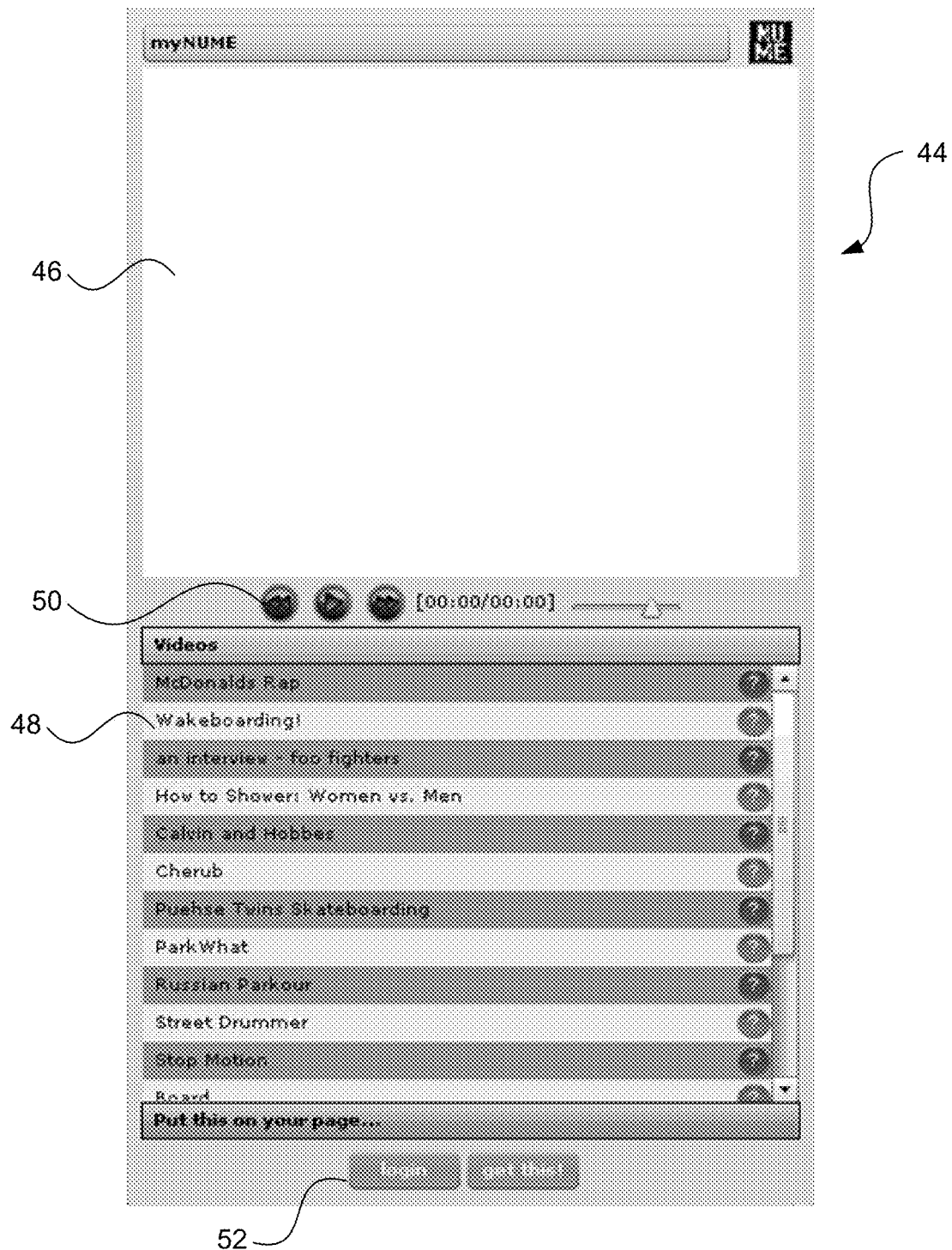
FIG. 3 shows a display of a representative media player of the present invention as it might be displayed in a webpage illustrating features of the embodiments of the invention.

FIG. 3 shows one embodiment of a media player 44 in accordance with some embodiments of the invention. The media player 44 may be displayed as an embedded part of a webpage or may be displayed on a stand-alone webpage dedicated solely to the display of the media player 44. Depending on the application and/or media for use with the media player 44, the media player 44 may be provided having varying sizes and with varying functionalities. The media player 44 may be provided with a media display area 46, a playlist 48, and media controls 50. Such features are commonly used in media players such as media player 44, and are easily recognized and used by various users when they are encountered in a webpage, such as on the Internet.

The media player 44 of embodiments of the invention, however, is advantageous for inclusion in webpages and Internet sites for many reasons. First, the webpage or Internet site on which the media player 44 is displayed need not devote its server space and resources to providing the code to host the media player and its associate functionality. Instead, a media player service provider may provide those services, and the inclusion of the media player may be provided by a small amount of simple HTML language (or similar code) in the webpage or Internet site. This advantage will be discussed in more detail later. Second, the actual media content played by the media player 44 also need not be hosted by the webpage or Internet site on which the media player 44 is displayed. Rather, the media player 44 may rely on and access remote instances of the media to be displayed over the wide-area network 38 (Internet) as selected and provided by the author of the playlist 48 displayed in the media player 44. Other advantages of the embodiments of the invention will be discussed later and will be understood by reference to the following discussion and by the practice of the invention.

Table 1 provides a listing of sample HTML language that may be used to embed an instance of the media player 44 in a representative webpage. Those of skill in the art will readily recognize that other variations of such HTML language may be used and is embraced by the embodiments of the invention. Those of skill in the art will also recognize that the provided language includes references to specific websites and further includes references to an instance of the media player 44 associated with a particular user. A portion of that language has been blacked out, but one of skill in the art will readily appreciate that any text string that uniquely identifies a particular instance of the media player 44 may be used in association with certain embodiments of the invention. Additionally, those of skill in the art will readily recognize how the individual HTML language may be modified to vary the size and placement of the media player 44 for each instance of the media player 44.

TABLE 1

<div style="width:200;text-align:center"><embed
src="http://wraps.mediaforge.com/wrapplets/videowrapplet/
videoWrapplet.swf" flashVars="vwid=
a5e80eb578efdc081fb502e6824ab5a1" width="200"
height="350" name="mfVideoWrapplet" type="application/
x-shockwave-flash" pluginspage="http://www.adobe.com/
go/getflashplayer"></embed></div><div style=
"width:200;text-align:center"><a href="http://www.nume.com/
links/?lid=footerImage&aid=videoWrapplet&uid=
a5e80eb578efdc081fb502e6824ab5a1" target="nume">
<img border="0" src="http://www.nume.com/images/visit/
wrap_tag_simple_200.gif" width="200"
height="30" alt="nume.com"/></a></div>

Figure 10:
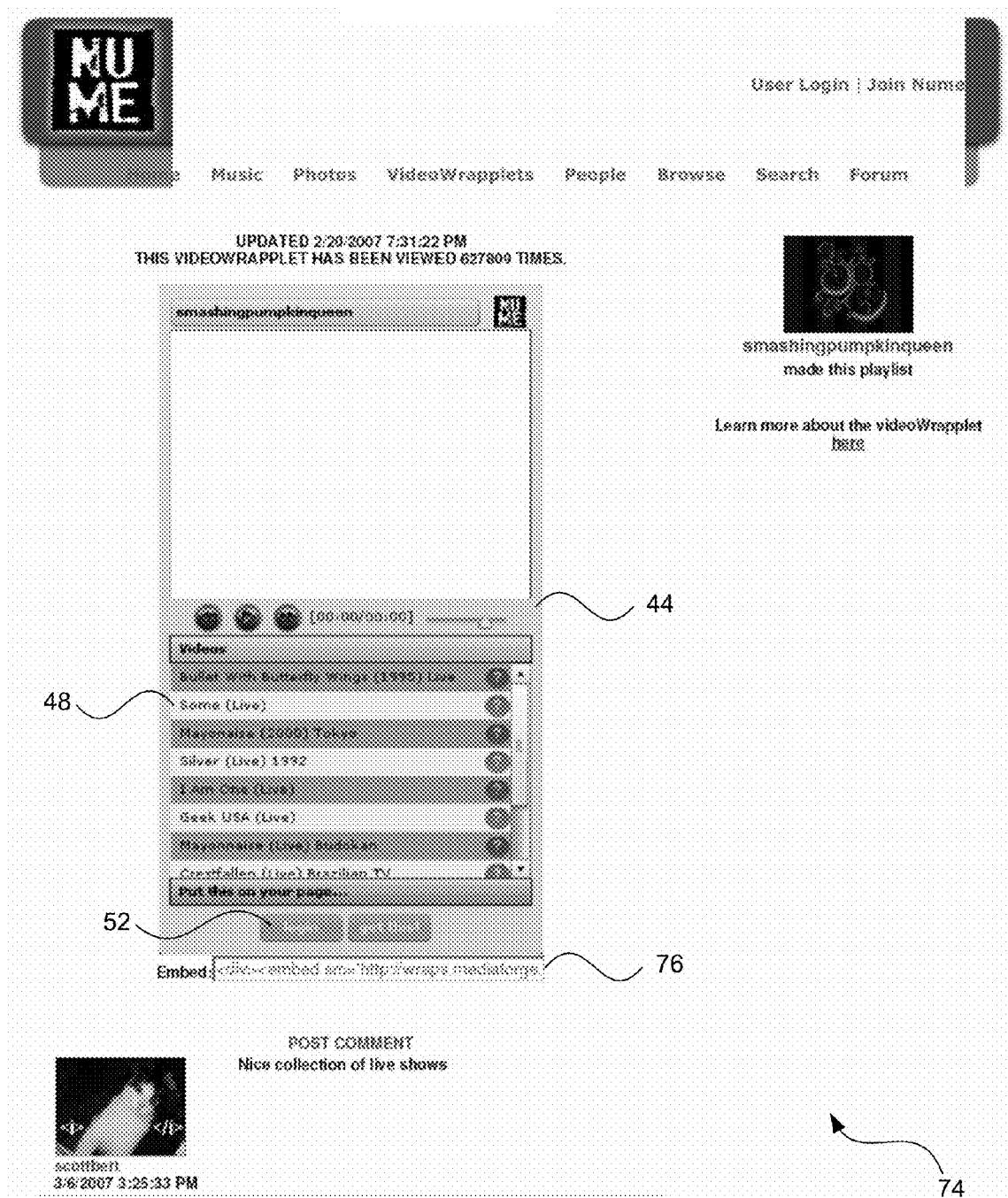
FIG. 10 shows a display of a representative webpage having an embedded media player in accordance with embodiments of the present invention.
Figure 11:
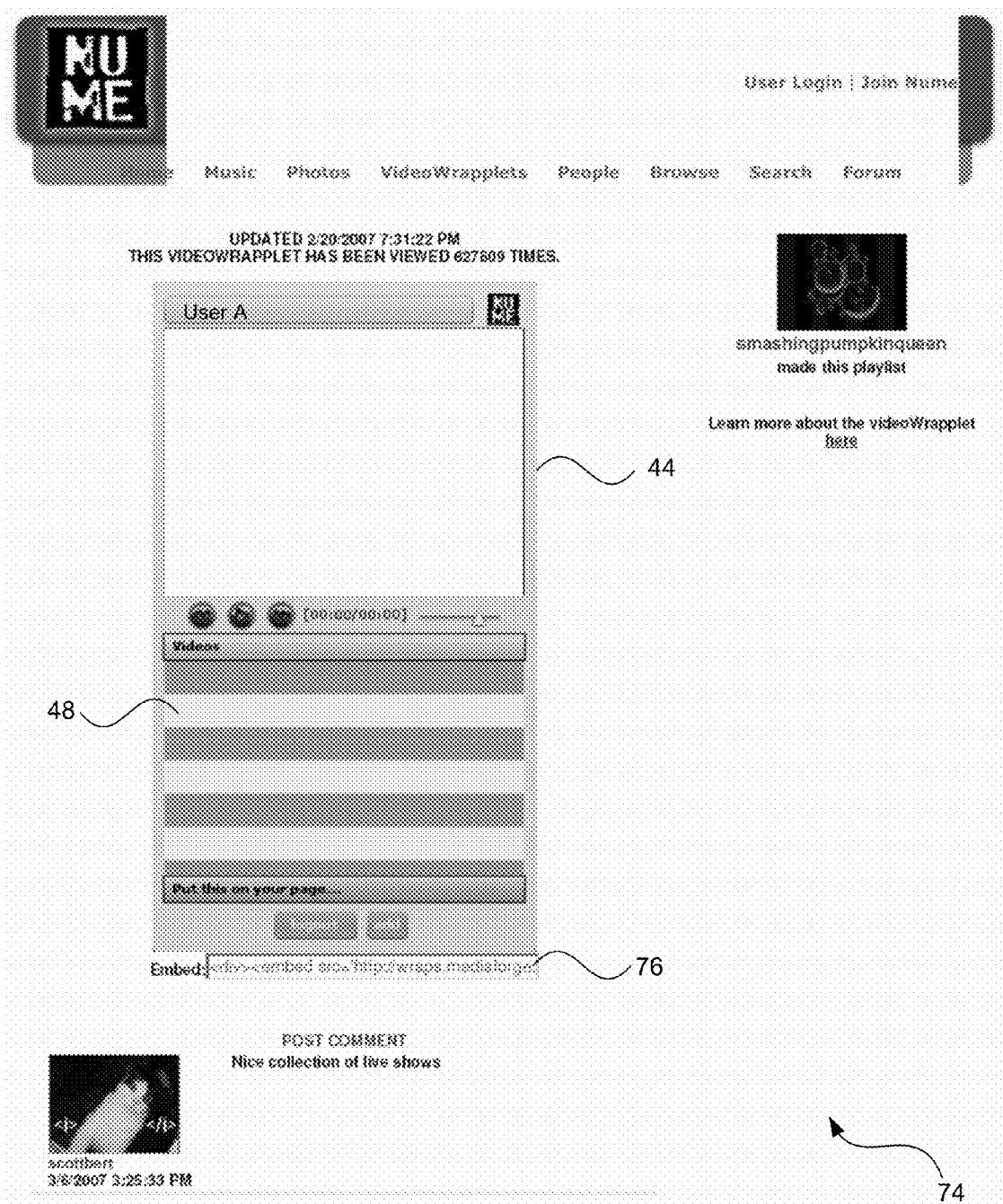
FIG. 11 shows a display of a representative webpage having an embedded media player in accordance with embodiments of the present invention.

It may be readily appreciated by reference to Table 1 that the HTML language illustrated as providing an instance of the media player 44 in a webpage or Internet site is not exclusive. That is to say that the same language may be inserted into a plurality of websites so as to provide multiple instances of the media player 44 having the same playlist 48. Thus, an author of a playlist 48 of one instance of the media player 44 may have that playlist 48 and instance of the media player 44 (as well as access to the associated media) copied and inserted in any number of webpages. Thus embodiments of the invention allow viral spread of author's playlists 48 and media players 44 and access to the media simply by inserting a few lines of HTML code into various webpages and Internet sites. In some embodiments of the invention, each instance of the media player 44 that is inserted into a webpage or Internet site may include a link providing the HTML code for that instance for others to copy, or each instance may simply display a box including the code for others to copy, such as is seen in FIGS. 10 and 11. Thus, an author of a playlist 48 may easily allow others to copy his or her instance of the media player 44 and distribute it widely to other locations on the Internet or network 38. As may be readily appreciated, those instances of the media player 44 and playlist 48 that other users find entertaining or valuable may spread exponentially as newly-inserted instances are found by other users and copied from one site to another.

Because some embodiments of the invention are designed to be spread in this viral nature, another advantage of the embodiments of the invention becomes apparent. Because each instance of the media player 44 and playlist 48 need not be hosted on the individual website on which it is displayed, any updates to the media player 44, media, and/or playlist 48 may be instantly transferred to all instances of the media player 44 and/or playlist 48 without requiring that the author of the media, playlist 48, or media player 44 seek out all instances provided by uncontrolled users across the Internet and the world. This may provide special benefits to the owners of copyrighted works, as the owners of copyrighted works need not worry about thousands of copies of their works distributed across thousands of webpages and controlled by thousands of individuals. Instead, the copyright owner need only control a single instance of a playlist 48 or a single instance of the media source for the playlist 48, and will instantly control all other instances embedded in websites throughout the world. Thus a copyright owner could distribute media in a controlled way for a limited time, then disable access to the copyrighted media at will without worrying about where the copyrighted media might have migrated during the time the media was being distributed.

Another advantage of embodiments of the invention is provided by the remote hosting possibilities of the media player 44 and playlist 48. Because the remote source may provide the media player 44, it is possible to provide access to a particular playlist 48 to that playlist's author through any instance of the media player 44 and any instance of the playlist 48, regardless of whether the playlist 48 to be accessed is a copy of the instance where access is sought or not. This may be provided by the login link 52 provided within the instance of the media player 44, as displayed in FIG. 3. For example, suppose a user, User A, has authored a playlist 48, namely Playlist A. Suppose, further, that User A is browsing on the Internet, and encounters an instance of the media player 44 and playlist 48 on a website that User A does not control and has not previously visited. The instance of the media player 44 and playlist 48 may or may not be a copy of User A's Playlist A (as someone else may have used the HTML code to insert a copy of User A's Playlist A in his or her website). The website may be controlled by a second user, User B, and the playlist 48 displayed may be a Playlist B authored by User B, or it may be a Playlist C authored by a User C unrelated to either User A or User B (the owner of the website).

Regardless of whether the playlist 48 displayed on the website is Playlist A, Playlist B, or Playlist C (that is, whether the playlist 48 is authored by User A who is accessing the site, by User B who controls the site, or by an unrelated third party User C), embodiments of the invention would still provide the login link 52 displayed in FIG. 3. Because the login link 52 may be provided by the service provider providing the media player 44, the login link 52 may be used to access any user's playlist 48. Thus, User A, on encountering the instance of the media player 44 on another user's website, might remember that he or she had been meaning to update the media or playlist 48 of User A's Playlist A, and might then click on the login link 52 displayed in FIG. 3. On doing so, the instance of the media player 44 that User A encountered on the website might change its display to that shown in FIG. 4. However, as the media player 44 may be provided as an embedded player in the web site User A encountered, the remainder of the website could remain unchanged, as will be discussed further with regards to FIGS. 10-11.

Figure 4:
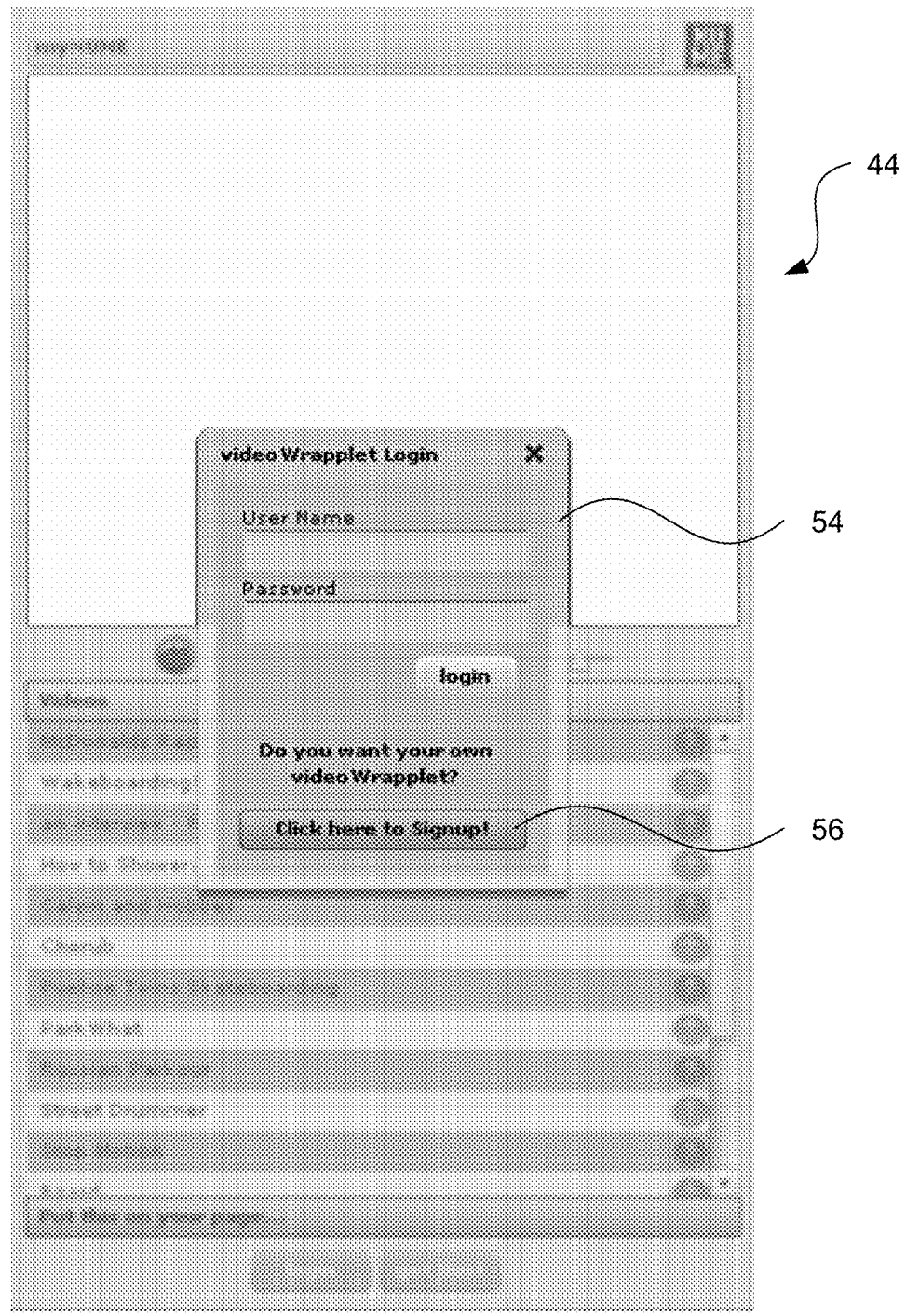
FIG. 4 shows a display of a representative media player of the present invention as it might be displayed in a webpage illustrating features of the embodiments of the invention.

FIG. 4 shows the media player 44, as it may be displayed in the webpage, after a person has selected the login link 52. After the login link 52 has been selected, the media player may display a login box 54. The login box 54 allows a user (such as User A) to log in to that user's playlist(s) regardless of the playlist 48 normally displayed on the webpage where the login is attempted. In some instances, the login box 54 may also display a signup link 56 to allow someone who has not yet authored a playlist 48 to join services provided by the service provider, author a playlist 48, and insert instances of the new user's playlist 48 into a website of the new user's choosing. Selecting the signup link 56 may direct the user to another website, or the signup process may be handled through the media player 44 so that the new user never leaves the original site where the media player 44 was encountered. This increases the quasi-viral ability of embodiments of the invention to be spread throughout a network 38 such as the Internet.

Figure 5:
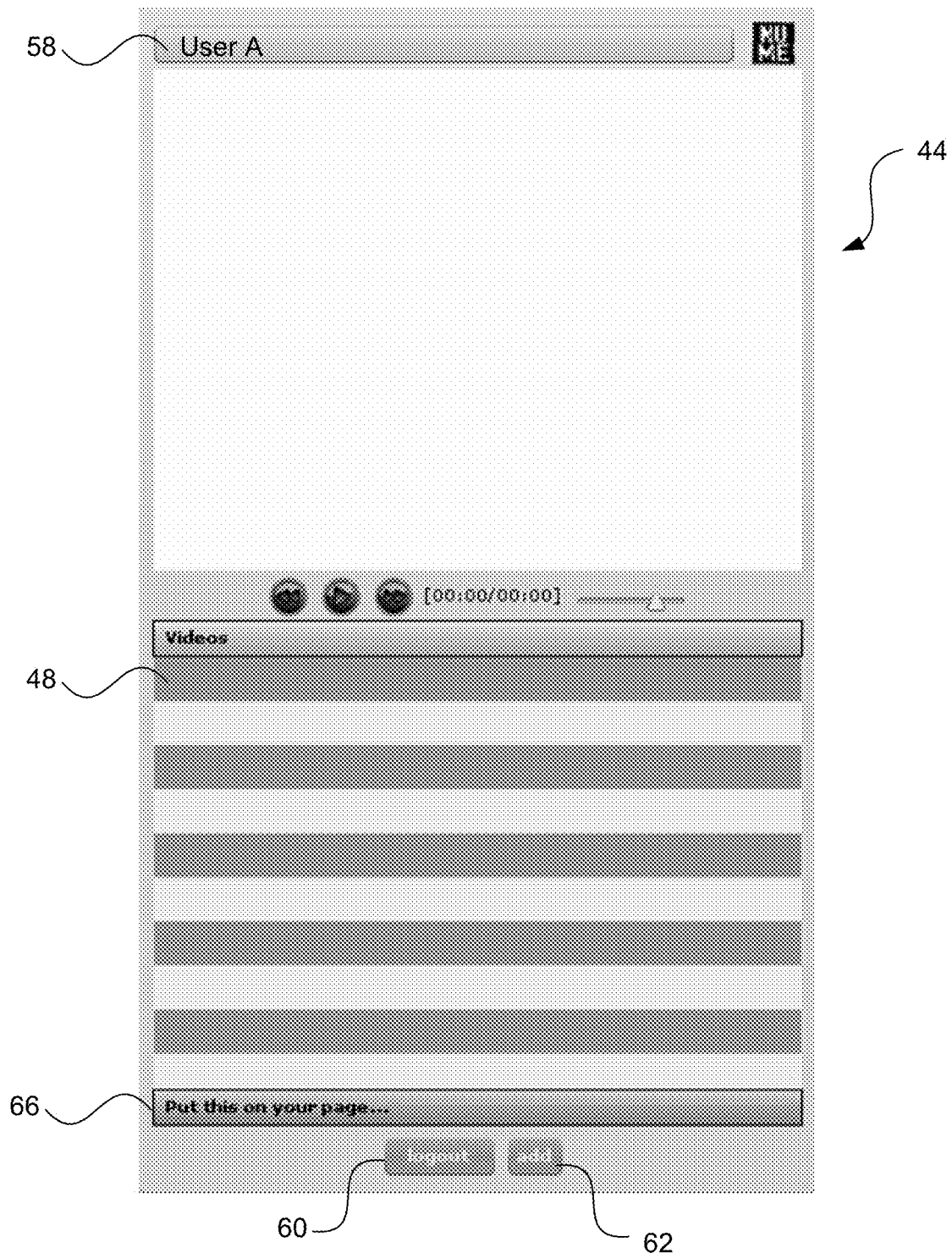
FIG. 5 shows a display of a representative media player of the present invention as it might be displayed in a webpage illustrating features of the embodiments of the invention.

As illustrated in FIG. 4, when the login box 54 is displayed, the media player 44 may fade or obscure the information from the originally-displayed playlist 48 and media player 44, as a prelude to the fact that the media player 44 may soon be showing a different user's playlist 48. This provides a visual transition for users of embodiments of the invention, but is not important to the functioning of the embodiments of the invention. Once a user, such as User A, has successfully entered his or her login information into the login box and has selected to login, the display provided by the media player 44 may change to a display similar to that in FIG. 5. This display is similar to that shown in FIG. 3, with several differences.

First, the display now shown will be of the playlist 48 of the logged-in user, such as that of User A (Playlist A). In the embodiment shown in FIG. 5, the playlist 48 is shown as being empty, which may be the case if the user has not selected media to include on the playlist 48, or may also be the case for the new user after the new user's first successful login or signup. Additionally, a title bar 58 may have changed to identify the user and/or the new playlist 48 being shown. It should be recalled that the original webpage on which the user signed in need not have changed: the user can access his or her playlist 48 without ever changing the web page where access was sought to the user's playlist 48.

Second, the login link 52 may be replaced with a logout link 60. If at any time the user selects the logout link 52, the media player 44 may immediately return to its original display, that is, the display normally shown on the webpage where the user accessed the user's playlist 48. Thus, the actions taken by the user upon logging in to the media player 44 have no effect on the version of the media player 44 shown on the webpage, unless the instance of the media player 44 shown on the webpage is an instance of the media player 44 and playlist 48 accessed and edited by the user. (Such may be the case when a user accesses the media player 44 from the user's own website or where the user finds a copy of the user's media player 44 and playlist 48 on someone else's website.) Additionally, it should be recognized that each accessed copy of the media player 44 acts independently of each other accessed copy of the media player 44. For example, just as many websites today currently allow media to be displayed on a website and to have multiple users accessing the media at different points in the media (i.e. one user may be in the middle of a song or movie, another user may be near the end, and another user near the beginning, etc.), multiple users may simultaneously and independently access and control the media player 44 displayed on a particular website and may access the media player 44 for all its functionality.

For example, one user, User D, may access a website, Website C, and encounter the media player 44 showing a playlist 48 such as Playlist C. User D may simply begin watching/listening to/accessing, etc. media from Playlist C. Shortly thereafter and while User D is accessing the Website C and the media player 44, User A may access the Website C and may login to the media player 44 to access User A's Playlist A. This would have absolutely no effect on the experience of User D accessing Playlist D from the same Website C, and User A might still remain on Website C accessing the media player 44 to access Playlist A. Shortly thereafter and while Users A and D are accessing the Website C and the media player 44 as described above, User B may access the Website C and the media player 44. As long as User B is not logged on to the media player 44, the playlist 48 displayed will still be Playlist C, regardless of the fact that User A has accessed the Website C and the media player 44 and has logged on to access Playlist A. Thus, access to the media player 44 may be provided through any instance of the media player 44 without necessarily affecting the particular instance of the media player 44 for other users of the Internet.

Suppose further, however, that User C, the author of Playlist C, while the other users are accessing the Website C and the media player 44 as described in the preceding paragraph, now enters a website, Website E, and encounters an instance of the media player 44. The instance may be a copy of User C's playlist 48, Playlist C, or it may show any other playlist 48, as described above. User C could log in to the media player 44 and access and change the Playlist C to change the media contained on Playlist C or could change the media referenced by Playlist C. Even though User C accessed the media player 44 and User C's Playlist C on Website E not related to Website C, User C's updates of Playlist C could change the experience of User D, User A, and User B in various ways. User A, being logged in to the media player 44 and accessing Playlist A, would not notice any immediate change, but might find changes to the playlist 48 displayed on the media player 44 of Website C upon logging out.

The other users, User D and User B (and User A on logging out) may encounter changes to the playlist 48 displayed on the instance of the media player 44 displayed on Website C in various ways. In some embodiments, the updates entered by User C could be instantly provided to the display and playlist 48 encountered by User D and user B (and User A on logging out) as soon as they are made by User C. In other embodiments, the display and playlist 48 may be changed only when User C completes his or her changes and logs out (on Website E). In still other embodiments, the display may change either as soon as they are made by User C or when User C logs out, but only in those instances where the media player 44 or changed media is not actively being used by the instance to be changed. Thus, in some embodiments, if User D is watching/using a particular piece of media that User C removes from Playlist C, User D would not be interrupted from accessing the media by the update to Playlist C for that particular viewed embodiment displayed on a computer used by User D until after User D stops accessing/using the media player 44 or the particular media. Meanwhile, in some embodiments, even though the media player 44 might be displayed on the screen of User B, the change to Playlist C may be implemented on the screen of User B if User B is not actively using the media player 44 or actively accessing the particular piece of changed media.

Thus, it can be seen that the remote hosting of the media player 44 and the login and display mechanisms of the embodiments of the invention provide for outstanding flexibility and control of the media player 44, the playlists 48, and the various embodiments and instances thereof. Returning now to FIG. 5, an additional link may be provided once a user has logged on to the media player 44 to access the user's playlist 48. The additional link is an add link 62. The user can select the add link 62 to add additional media to the user's playlist 48. On selecting the add link 62, the display of the media player 44 may change to a display such as that shown in FIG. 6 (of course, as will be recognized from the above description, the remaining web page on which the media player 44 is displayed need not otherwise change, as is true for any selection of a link or playing of media within the media player 44).

Alternatively, in some embodiments, not specifically illustrated in the Figures, upon selecting the add link 62, the user may be provided with a prompt asking the user whether the user would like to add new media and/or media playlist information or whether the user would like to obtain media contained in the playlist 48 of the instance of the media player 44 into which the user logged in and/or whether the user would like to obtain all or a portion of the playlist 48 (i.e. the links to and descriptions of the media) of the instance of the media player 44 into which the user logged in. In this way, a user who encounters media and/or a playlist 48 that he or she likes may log in to the instance of the media player 44 where the user encountered the media and/or the playlist 48, and may acquire and/or replicate the media assets (whether the media itself or all or a portion of the playlist 48). When media is copied in this way, it may automatically be copied to a storage location provided by the user, and when all or a portion of the playlist 48 is copied in this way, the playlist names and linking information may be copied to the user's account contained on the host service provider's computers or servers.

In this additional way, the media and playlist 48 may also spread not only by inserting copies of a particular instance but also by acquiring/copying the media and/or playlist 48 from one user's instances of the media player 44 to another user's instances of the media player 44. Some embodiments of the invention may provide a user with options of preventing the copying of the user's playlist 48 and/or some or all of the user's media by others to protect the user's rights in the media, such as copyright rights. In such embodiments, no prompt to obtain media or the playlist 48 may be provided, or a notification may be provided to a user that copying of the particular media/playlist 48 is not permitted.

Figure 6:
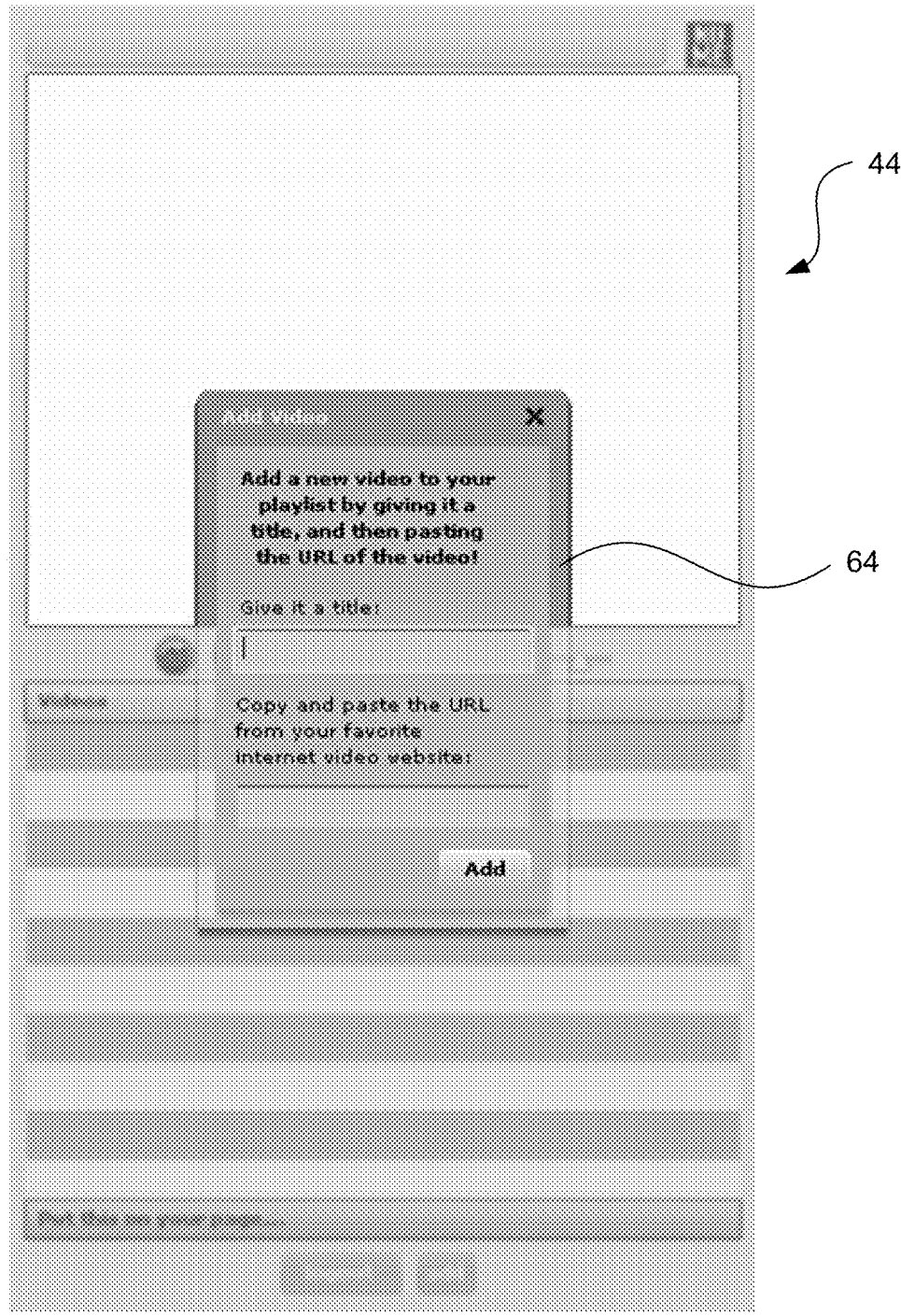
FIG. 6 shows a display of a representative media player of the present invention as it might be displayed in a webpage illustrating features of the embodiments of the invention.

FIG. 6 shows an add media box 64 displayed by the media player 44 for adding new media, when action indicating a desire to add new media to a user's playlist has been performed. While FIG. 6 shows a prompt for adding video, embodiments of the invention embrace the addition of any type of media, including text, e-books, video, audio, 2-dimensional and 3-dimensional still and motion graphics and pictures, slide shows, slide shows with sound, games, interactive media, and the like. The user may enter a title for the media as well as a uniform resource locator (URL) at which the media is located to add the media to the playlist 48. Therefore, the media on a particular playlist 48 need not be hosted on the website on which the media player 44 is displayed, and further need not be hosted on the website/server hosting the media player 44, but may instead simply be referenced by URL and streamed into the media player 44. This provides extreme flexibility in the use and display/provision of various types of media on multiple user's playlists 48 through many instances of the media player 44. Thus if three users incorporate the same media in their playlists 48 from a single source location, and those three user's playlists 48 are copied to multiple websites by those users and by other users as described above, a particular piece of media located at the single source location may be effectively distributed to hundreds, thousands, or many more locations on the network 38 (Internet) for access without requiring storage on each server/website from which the media may be accessed.

In some embodiments, additional mechanisms may be provided for providing the media to the user's playlist 48. For example, in some embodiments, the add media box 64 displayed by the media player 44 may further include an option to select a file location for upload of a media file. Thus, a user could upload a media file not currently available on the network 38/Internet but on the user's computer or on a computer media of the user for hosting by the service provider of the media player 44. Those of skill in the art will readily recognize that any method of providing access to media for the media player 44 is embraced by the embodiments of the invention.

In other embodiments of the invention, as set forth above, the add media box 64 might provide a user with an option to add one or more pieces of media contained on the playlist 48 normally associated with the instance of the media player 44 displayed on the website where the user logged in when no user is logged in to that instance. This would allow simple and easy spreading of popular media items from playlist 48 to playlist 48. Thus, if a user surfing the web were to discover a media player 44 having a playlist 48 with one or more media items that the user wanted to have on his or her own playlist 48, the user could log in and select the add link 62 and in the add media box 64 of those embodiments, the user could select to add media from the playlist 48 of the current website. The media player 44 could then display the playlist 48 that is normally displayed on the current website and could then provide the user with the opportunity to select one or more items from that playlist 48 to add to the user's own playlist 48. While the user's own playlist 48 could be updated in this way, no change to the source playlist 48 would typically occur. This advancement is made simple and possible by simply copying the URL to the media from the source playlist 48. In some embodiments of the invention where playlist items may be copied from one playlist 48 to another, users may be given the option to prohibit the copying of all or a portion of their playlist 48 to other playlists 48. This may be particularly important for certain copyright owners wanting to limit distribution and/or presentation of their copyrighted work. Additionally, as set forth above, the media player 44 could also permit acquisition of a full copy of any selected media, if permitted by the media's owner.

Figure 7:
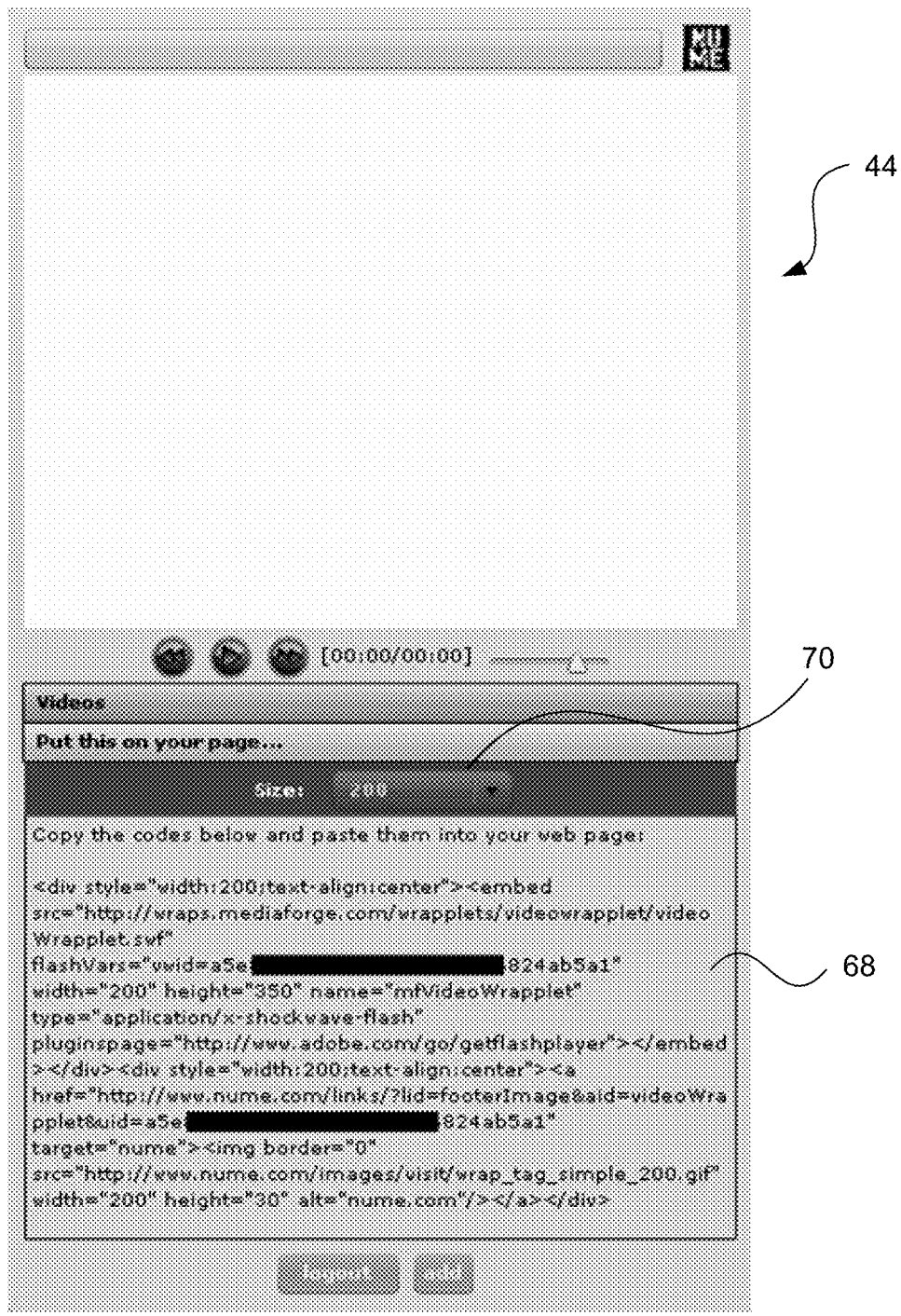
FIG. 7 shows a display of a representative media player of the present invention as it might be displayed in a webpage illustrating features of the embodiments of the invention.
Figure 8:
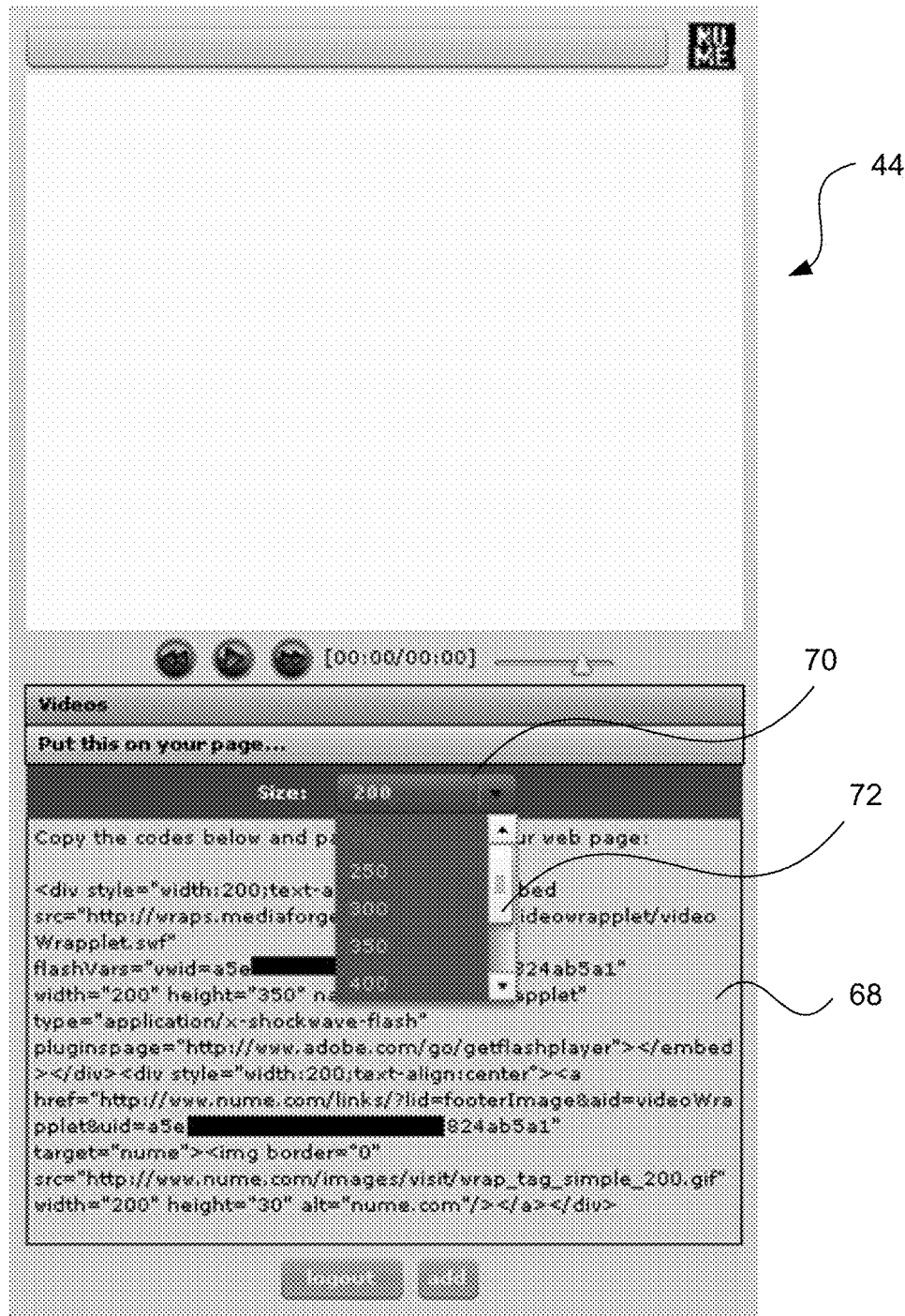
FIG. 8 shows a display of a representative media player of the present invention as it might be displayed in a webpage illustrating features of the embodiments of the invention.

Returning now to FIG. 5, the media player 44 may also include an embed instance of player link 66. The embed instance of player link 66 may be provided by the media player 44 whether the user is logged in or logged out. Selecting the embed instance of player link 66 may cause the media player 44 to switch to a display such as that of FIG. 7. The exemplary display of FIG. 7 includes an embed instance text box 68 that includes instructions and HTML text for embedding an instance of the media player 44 into a web page. The HTML text for embedding an instance of the media player 44 into a web page is similar to the HTML text discussed above and contained in Table 1. The HTML text shown is provided for illustrative purposes only and is not intended to be limiting in any way, as many other examples of HTML text, other types of inserting code, or any other methods of embedding instances of the media player 44 in web pages are embraced by the embodiments of the invention. As with the HTML text of Table 1, a portion of the unique user-identifying code shown in FIGS. 7-9 has been blacked out, and those of skill in the art will recognize that any unique instance-identifying HTML code may be used.

Figure 9:
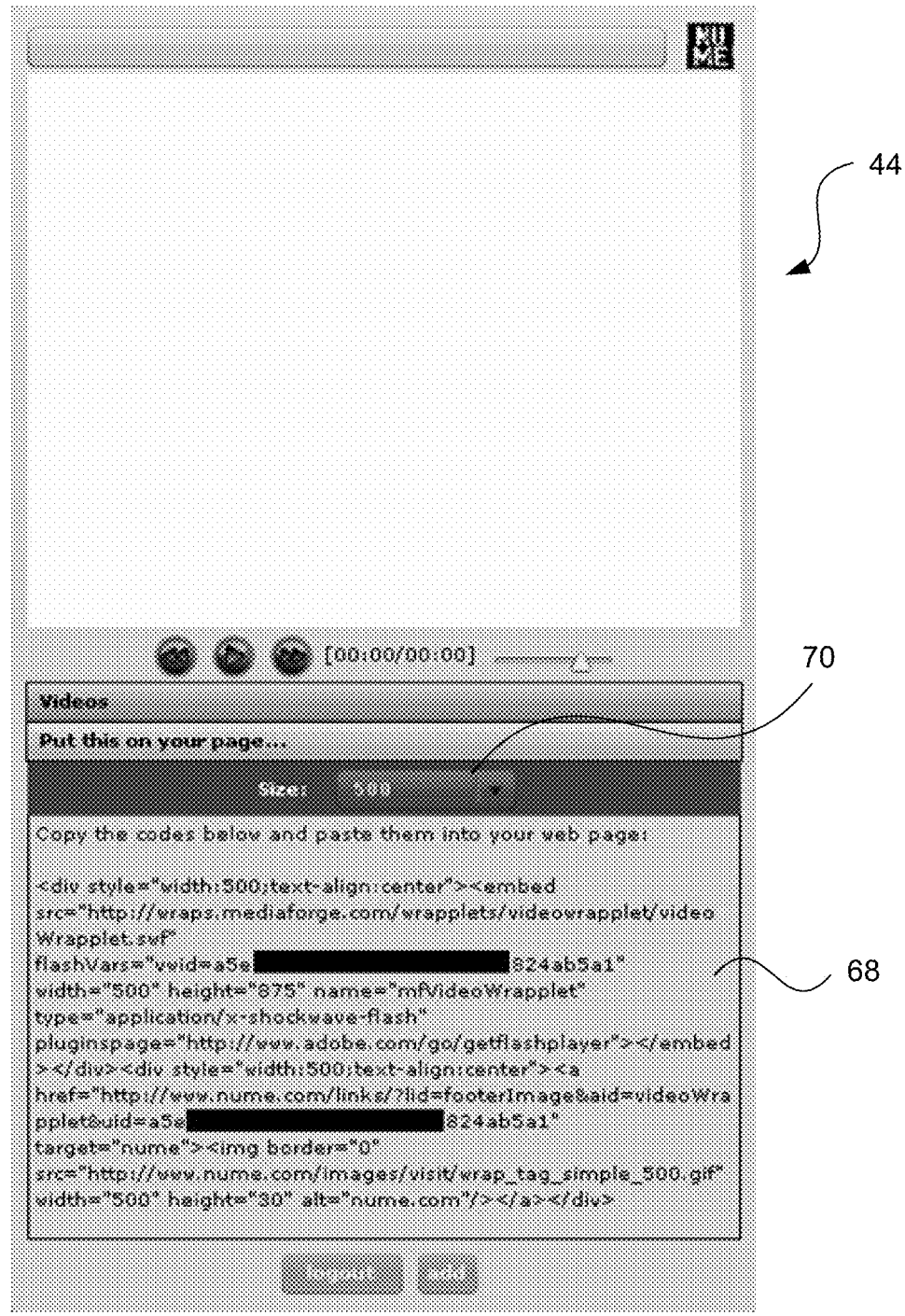
FIG. 9 shows a display of a representative media player of the present invention as it might be displayed in a webpage illustrating features of the embodiments of the invention.

In some embodiments of the invention, the embed instance text box 68 may be further provided with a size selector 70. The size selector 70 may be provided to allow the user to choose/modify the HTML text to provide an appropriately sized instance of the media player 44 to embed in the web page. If the size selector 70 is selected, a size pull-down menu 72 may appear as displayed in FIG. 8 to allow selection of various sizes of the instance of the media player to be embedded. The selection of a different size may modify the HTML text, as is shown in FIG. 9 and as will be appreciated by one of skill in the art.

As may be appreciated from the above description, the embed instance text box 68 may be displayed regardless of whether the user is logged in to the media player 44 or not. However, in at least some embodiments, the HTML text displayed in the embed instance text box 68, and more particularly the unique instance-identifying text, may be different depending on whether the user is logged in or not. If the user is logged in, the unique instance-identifying text may be changed so as to identify the playlist 48 associated with that user's account (and thus the playlist 48 being edited by the user at the time). If the user is not logged in, the unique instance-identifying text may be changed so as to identify the playlist 48 currently being displayed on the particular web page to allow copies of that instance to be spread to other pages.

As has been described above, logging in to the media player 44 so as to access a particular user's playlist 48 need not change any aspect of the webpage being viewed other than the particular display of the media player 44 embedded in the webpage. This is illustrated by FIGS. 10 and 11. These Figures show an illustrative webpage display 74 having an embedded media player 44 before (FIG. 10) and after (FIG. 11) login by a user. As may be seen from the Figures, after login by the user by selecting the login link 52 and logging in as described earlier, the display of the media player 44 itself has changed to show the user's playlist 48 instead of the playlist 48 normally associated with the instance of the media player 44. However, other than the change in display of the media player 44, the webpage display 74 remains unchanged and all other information, media, and links remain active as before. In the embodiment of the media player 44 displayed in FIGS. 10 and 11, an embed instance text area 76 may be constantly displayed, as shown, to further encourage copying of the instance of the media player 44 and playlist 48.

As has been discussed above, some embodiments of the invention provide for different sizes of the media player 44 to be selected for each copied instance of the media player 44. Therefore, the display of media in the media player 44 may be different on each webpage where it is displayed. This may be accomplished by resizing the displayed media, when visual and where necessary, for each instance of the media player 44 where a particular piece of visual media is being displayed. The resizing may be accomplished by any method or mechanism known in the art, and may be accomplished by the media player 44 at the user's machine, by the service provider of the media player at a remote server/location, or by any other method.

As described above, instances of a particular media player 44/playlist 48 may be inserted into various webpages by inserting a minimal amount of HTML (or similar) code. Therefore, it is possible for instances to be spread as discussed above as one person desires to insert an instance, accesses the necessary code, and inserts it into his or her web page. Furthermore, however, it is possible to spread the necessary code by e-mail or other means, to further increase the ability of the instances to be spread. Therefore, a user (whether owner of the instance and playlist 48 to be spread or not) can e-mail the necessary HTML text to friends or acquaintances who need only copy the text from the e-mail and insert it into their webpages without ever being required to encounter an instance of the media player 44 for copying. Thus, the instances may be spread quickly and easily by a variety of methods.

Some embodiments of the invention may allow for limited or unlimited editing of a particular instance of the playlist 48. In some embodiments, a user may choose to allow others to edit his or her playlist 48 by providing limited access passwords or by other means known in the art. In some embodiments, the user may be notified when his or her playlist 48 has been edited, and the user may be provided with an opportunity to accept or reject the edits done by others. In other embodiments, a link may be provided whereby other users may suggest edits and additions to a playlist 48 to the author of the playlist 48, and the author may then accept or reject any or all suggested edits and additions. Some alternate embodiments of the invention allow for unlimited editing of playlists 48 by other users with moderators who decide whether edits should be accepted or not. In some such embodiments, the editing of playlists 48 by others may be limited to additions, and only the designated moderators would be capable of making edits to remove items from the playlists 48. Such embodiments may be particularly desirable for fan playlists 48 dedicated to media for a certain person, group, or hobby, for example. The various levels of collaborative editing of playlists 48 embraced by the invention should not be limited by any of the foregoing description.

Embodiments of the invention also provide for methods of tracking various pieces of information associated with the playlists 48, the media players 44, and the associated media. Such tracking may be very useful for a variety of reasons, some of which will be made clear below. The service provider may be able to track various types of information from the user of the media player 44 as the media player 44 is not stored on the various web sites where it is embedded. Rather, as described above, the media player 44 may be embedded in the various websites using HTML or similar code that references the media player from the service provider's website/servers. Because of this, the service provider may be able to track those websites with calls to the media player 44 and may therefore be able to track the number of websites (at least in a rough fashion, as changes may not become apparent until a call for the media player 44 is actually made) that have instances of the media player 44 embedded in them. Additionally, because each instance of the media player includes the unique instance-identifying text, the service provider is further able to track the number of instances of each playlist 48 that are distributed on the Internet and the number of times each instance is accessed.

This may be useful to gauge the popularity of the media player 44 in general and of certain playlists 48 in particular. The change in the tracked numbers of media players 44 and playlists 48 may be used to track rates of spread for various purposes, such as to determine increases and decreases in popularity. This may provide users with notifications of the need for additional advertising, and may further provide users with the ability to understand where their playlists 48 are being inserted to understand more about the demographics of those who find each playlist 48 appealing.

Furthermore, the number of times each particular playlist 48 and piece of media is accessed may also be tracked. This may also serve to better improve the knowledge of the service provider as to the popularity of certain playlists 48 and the individual media items. The potential of the sum of such tracking is essentially limitless. For example, a new musical band desiring name recognition might create a playlist 48 for their work, and may monitor the growth, distribution, and access of their playlist 48 to understand more about who appreciates their work, which songs are most listened to, etc. As another example, a political candidate may make a media playlist 48 containing various types of political material and advertisements. Tracking of the spread of the playlist 48 and the various types of media in the playlist 48 can help the candidate better estimate the candidates chances of success and what aspects of the candidate's campaign best appeal to voters without, at least initially, requiring expensive polling, etc. One of skill in the art will readily appreciate the various other instances where playlists 48, and the tracking thereof, may be particularly useful. One of skill in the art will also appreciate that the methods disclosed herein may be accomplished inexpensively with only minimal hosting of a single copy of most media items required.

Figure 12:
FIG. 12 shows a display of a banner advertisement in accordance with embodiments of the present invention.

The embodiments of the invention may also be used in advertisements and by advertisers, as may be readily apparent from the above description. For example, as the media player 44 may be a Flash®-based widget, an advertiser may take advantage of the Flash® functionalities to display media and a playlist 48 through an advertisement, such as a banner advertisement. By way of example, reference may be made to FIG. 12, which shows a sample banner advertisement 78 in accordance with embodiments of the present invention. The banner advertisement 78 itself may be a media player, and may play some media to the user visiting the website hosting the banner advertisement 78. As the banner advertisement 78 may be Flash®-based, a user encountering the banner advertisement 78 may interact with the banner advertisement 78, such as by mousing over the banner advertisement 78 or by clicking on the banner advertisement 78.

Figure 13:
FIG. 13 shows a display of a representative media player expanded from the banner advertisement of FIG. 12.
Figure 14:
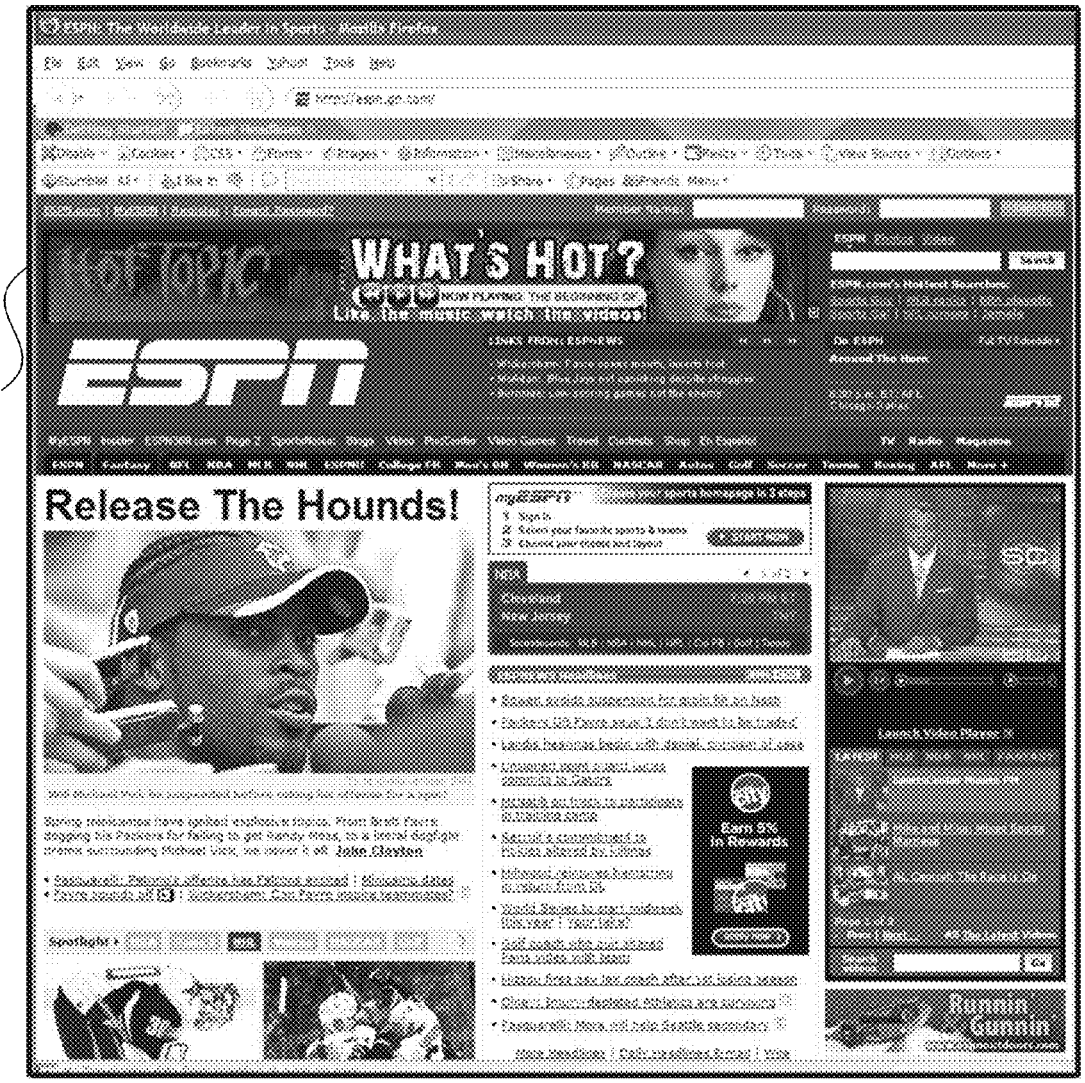
FIG. 14 shows a display of a representative webpage having the banner advertisement of FIG. 12.
Figure 15:
FIG. 15 shows a display of a representative webpage having the expanded media player of FIG. 13.

Upon such action being taken by the user, the banner advertisement 78 may expand to show a broader view of the media player 44, such as the view illustrated in FIG. 13. In this way, a more-fully-featured version of the media player 44 may be selectively shown, including information, a playlist 48 (not shown), and a link 80 to obtain a copy of the media player 44. Once a user has accessed the more-fully-featured version of the media player 44, in some embodiments, the user may acquire assets of the instance of the media player 44, including a portion of the playlist 48 (not shown) and/or the media being played through the media player 44, as discussed above. Thus, embodiments of the invention provide additional mechanisms through which an advertiser may distribute media through the banner advertisement 78 or other similar advertising using the media player 44. FIGS. 14 and 15 show how the banner advertisement 78 and expanded media player 44 may be incorporated into a webpage view, respectfully.

Alternatively, in other embodiments, the banner advertisement 78 may not require an action to display the full view of the media player and/or provide the full functionality of the advertisement. In such embodiments, the view illustrated in FIGS. 13 and 15 may be the initial view presented to users. In at least some embodiments, the media/media player/advertisement distribution features discussed herein may be accessed from the banner advertisement 78 whether or not an action (e.g. mouse-over) is required to access full functionality of the banner advertisement 78.

Figure 16:
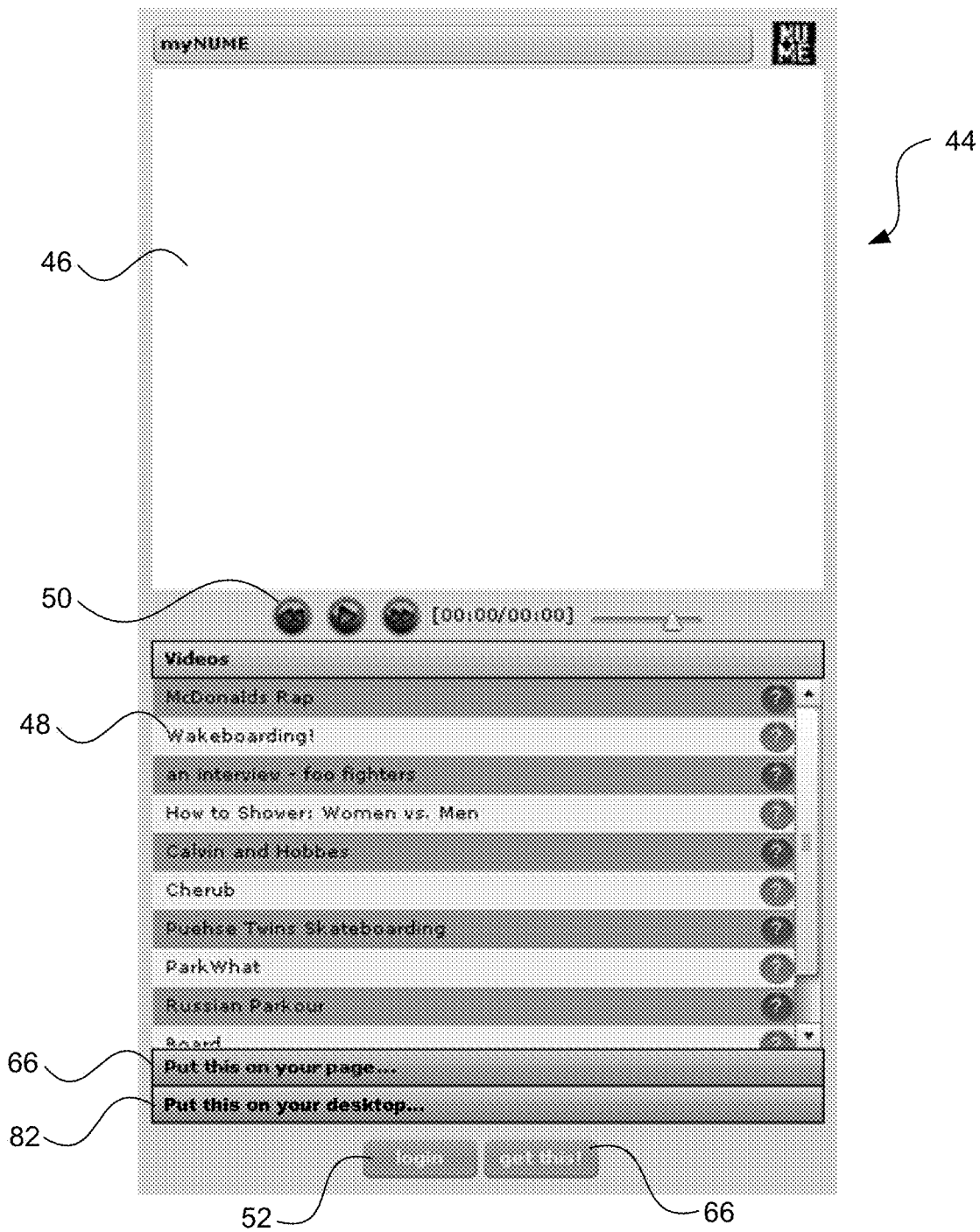
FIG. 16 shows a display of a representative media player of the present invention as it might be displayed in a webpage illustrating features of the embodiments of the invention.

FIG. 16 shows another embodiment of a media player 44 in accordance with embodiments of the present invention. In this illustrative embodiment, the media player 44 includes the media display area 46, the playlist 48, and the media controls 50, similar to other embodiments previously discussed. The media player 44 may also include the login link 52 and one or more embed instance of player links 66. In addition, the media player 44 may also include a put instance of player on desktop link 82. The put instance of player on desktop link 82 allows a user encountering the instance of the media player 44 to elect to put a copy of the instance of the media player 44 on the user's desktop. The instance placed on the user's desktop may exist outside of a traditional web browser and may exist on the user's desktop in one of several forms.

In a first type of embodiment, the instance of the media player 44 on the user's desktop may be provided by an executable file (e.g., .exe or .dmg) independent of other platforms or runtimes. For example, when a user selects the put instance of player on desktop link 82 in the encountered instance of the media player 44, wherever located, the instance of the media player 44 may provide a prompt, as is known in the art, to save an executable file to a location chosen by the user. The executable file could then be saved by the user in any desirable location, including locations on the user's computer, on a network location, or on a portable memory storage device such as a portable hard drive or portable flash memory device. The executable file may include all necessary files and information to provide one or more new instances of the media player 44, and may additionally contain media to be played by new instances of the media player 44. Alternatively, the executable file may not include any media, and any new instances of the media player 44 may access any necessary media over a network, as previously discussed. Installation of the executable file may provide an instance of the media player 44 on the desktop of the user. In some embodiments, the desktop instance of the media player 44 may be continually visible any time the user's desktop is visible, and in other embodiments, a link may be installed on the user's desktop or at some other location that opens the instance of the media player 44.

In a second type of embodiment, the instance of the media player 44 on the user's desktop may be provided as a widget to run on a desktop platform or runtime provided by a third party. For example, Adobe Systems, Incorporated is currently developing and has begun providing beta versions of a desktop or non-web runtime that allows developers to deploy rich Internet applications to the desktop. This runtime is currently being distributed as Adobe®AIR™ ("Adobe Integrated Runtime") and was previously code-named Apollo™. The AIR™ runtime permits deployment of rich Internet applications (e.g. Flash®-based applications, HTML, JavaScript, etc.) to the desktop environment without requiring the installation of additional application-specific features. Another example of a cross-browser, cross-platform plug-in that may be used with embodiments of the invention is Microsoft® Silverlight™, developed by Microsoft Corporation. Thus, in this and similar manners, an instance of the media player 44 may be deployed to the desktop of the user in a fashion similar to that obtained in embodiments using a stand-alone executable file.

As may be recognized by one of skill in the art, the put instance of player on desktop link 82 provides additional methods by which instances of the media player 44 may be distributed and may spread from site to site and/or computer to computer. For example, one user may have an instance of the media player 44 on his or her desktop, where it is viewed by another user. The second user may decide that he or she wants to obtain a copy of the instance of the media player 44 for his or her own computer, and may therefore select the put instance of player on desktop link 82 on the first user's instance of the media player 44. In this way, the second user might be allowed to save an executable file associated with the instance of the media player 44 found on the first user's desktop, and may transfer the executable file to his or her own computer by any means known in the art, such as by e-mail, by portable storage device, etc. Similarly, the second user might alternatively elect to select the embed instance of player link 66 to obtain HTML or similar code to embed an instance of the media player 44 on a website controlled by the second user. The second user might even use the first user's computer to access an Internet or other network location and place an instance of the media player 44 on that location after obtaining the proper HTML or other code representing an instance of the media player 44.

Figure 17:
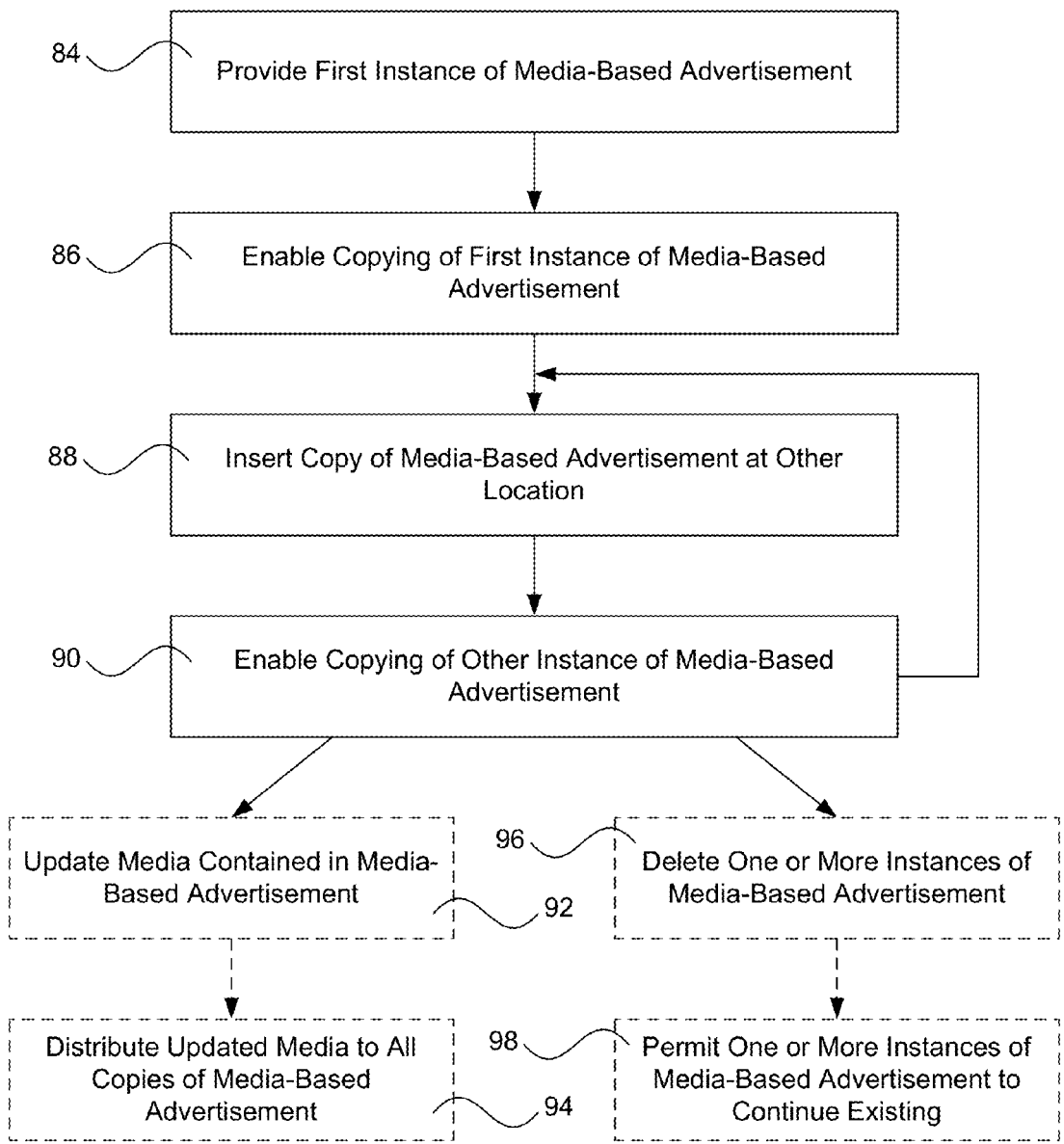
FIG. 17 illustrates a flowchart of methods in accordance with embodiments of the invention.

As may be appreciated from the previous discussion, embodiments of the invention such as those described above may be utilized by advertisers as part of a cost-effective media advertising campaign. A flow chart illustrating how such advertising may be accomplished according to embodiments of the present invention is illustrated in FIG. 17. Execution begins at step 84 with the provision of a first instance of a media-based advertisement. As set forth herein, the media-based advertisement may comprise a banner advertisement, a media player embedded in a web page, a banner advertisement that expands into an embedded media player when the banner advertisement is selected or hovered over by a pointer icon (a mouse-over event), a banner advertisement, media player, or other widget on a desktop provided through a stand-alone application or through an existing runtime, or any other mechanism for providing a media-based advertisement. The media-based advertisement should at least intermittently connect to a network to ensure that the media contained in the media-based advertisement is up-to-date. In this way, the first instance of the media-based advertisement may be updated or changed to reflect changing media and/or changing advertising by the advertiser, according to methods and mechanisms described above, and as will be described further below. As may be appreciated, "media" in such embodiments may include textual forms of media, including notifications of promotions or discounts, promotion codes, electronic and/or printable coupons, etc. As such, the media player/banner advertisement, etc. utilized as described herein may also be a media display distribution tool, as each media player/banner advertisement, etc. displays and distributes "media" as defined above. Furthermore, the media player/banner advertisement, etc. may also include links that may connect the user with a vendor of goods or services, or to some other site.

Execution proceeds to step 86, where copying of the first instance of the media-based advertisement is enabled. This may be done by one or more embed instance of player links 66, the embed instance text box 68, by the put instance of player on desktop link 80, or by any other similar mechanism that permits the insertion of another instance of the media-based advertisement in a different location. As may be appreciated, the step of enabling copying of the first instance of the media-based advertisement may include steps of copying HTML or similar code for insertion in other webpages, and may include downloading a desktop widget or application. Execution then proceeds to step 88 where a copy of the media-based advertisement is inserted at another location, and to step 90 where the copy of the media-based advertisement may permit additional copies to be generated. As will be appreciated from the discussion herein, execution may loop through steps 88 and 90 to permit quasi-viral spread of the media-based advertisement to a plurality of locations.

In this manner, an advertiser may achieve widespread distribution of a media-based advertisement from a single initial distribution point or from a small number of initial distribution points. Additionally, the lifetime of the media-based advertisement may extend beyond the initial lifetime or paid placement of the original media-based advertisement. If any percentage of the viewers who encounter a particular instance of the media-based advertisement elect to make and insert a copy of the media-based advertisement, then the total number of views of the media-based advertisement may increase exponentially, greatly increasing the value of the media-based advertisement.

An additional advantage of the media-based advertisement is that the media displayed in the advertisement may be updated and distributed to all copies of the media-based advertisement as has been discussed herein. Therefore, optional steps may be added to the process illustrated in FIG. 17. In step 92, an advertiser may update media content of the media-based advertisement. In step 94, the updated media content is distributed to all copies of the media-based advertisement. As may be appreciated, one or more copies of the media-based advertisement may not be active or may not be connected to a network in such a way as to instantaneously receive updates to the media content of the media-based advertisement. In such instances, updated media may be accessed at the next time when the one or more copies is active and/or has access to the updates through a network. In some embodiments, as discussed above, others other than the advertiser may be given a limited or full ability to update, add, and/or delete media content to or from the media-based advertisement, depending on the preferences of the advertiser.

It is anticipated that one or more copies of the media-based advertisement may eventually be deleted or discontinued, such as at optional step 96. This may occur, for example, when the paid duration of initial placement of the media-based advertisement has expired. As another example, a user who copied the media-based advertisement may also elect to remove his or her copy of the media-based advertisement. In some embodiments, execution may proceed to step 98, where one or more other instances of the media-based advertisement may continue to exist and display the media-based advertisement. In this way, the advertising investment of the advertiser may continue to provide returns. In other embodiments, the advertiser may elect to discontinue other copies of the media-based advertisement, such as when an advertising campaign has ended or is no longer relevant.

For example, an advertiser may wish to terminate an advertising campaign when a particular sale has ended. Alternatively, an advertising campaign may be terminated when an advertised movie is no longer playing in theaters. Some advertisers or advertisements are short-lived, and if an advertiser or an advertised business has gone out of business, it may be advantageous to stop advertising. Advertising may stop for any other reason besides those specifically discussed herein. In some instances, it may be possible to update media in the media-based advertisement to relate to another advertised entity or advertiser, and in such instances the media-based advertisement need not be entirely deleted or discontinued.

Several examples of media-based advertisements will be discussed with some specificity. Those of skill in the art will recognize that the examples are merely illustrative, not limiting, and will recognize the many other types of advertisers and media-based advertisements that fall within the scope of the embodiments of the present invention. In the illustrative embodiment, a movie studio may wish to advertise for an upcoming movie release. The studio may therefore pay to place a banner-ad type media-based advertisement in a popular website, enabling copying of the media-based advertisement by others. In this example, the media-based advertisement may play one or more trailers for the upcoming movie, and may additionally include a countdown timer to the date of movie launch. The studio may allow the media-based advertisement to be copied into other web pages and onto fans' desktops, where the media-based advertisement may provide the fans and others with the movie trailers and the countdown timer. Since the studio may update the media content of the media-based advertisement, the studio may elect to vary the one or more trailers from time to time to encourage fans to continue viewing and using the media-based advertisement, and to reward fans for their continued use of the media-based advertisement. Additionally, the movie studio may elect to provide one or more movie-related games or other media applications through the media-based advertisement. Thus, embodiments of the invention provide advertisers with numerous advantages not heretofore available.

In another illustrative example, a retailer, wholesaler, or other merchant may provide a banner advertisement on the merchant's own web page or as a paid advertisement on some other web page, such as on a search engine, a shopping search engine, or any other web page. The banner advertisement may allow a user to grab or obtain a widget, program, media player 44, banner advertisement 78, etc. in the manner discussed above, and to insert the widget, program, media player 44, banner advertisement 78, etc. onto the user's desktop, personal web page, or some other desirable location. Through the widget, program, media player 44, banner advertisement 78, etc., the merchant may periodically notify the user and others of special deals or other promotions provided by the merchant, including electronic coupons and promotion codes.

In some embodiments, the widget, program, media player 44, banner advertisement 78, etc. may be displayed on the user's desktop continuously and may be provided with updated advertising information as needed, and in other embodiments, the widget, program, media player 44, banner advertisement 78, etc. may be hidden or remain in the background until either selected for viewing by the user or when updated information is received. When updated information is received, a notification may be displayed to the user and/or the widget, program, media player 44, banner advertisement 78, etc. may become visible or more prominent for a defined time or until acknowledgement of the updated information is made by the user. In these and similar fashions, this mini-client provides an extra point of contact and touch between a merchant and the merchant's existing and potential client base. Indeed, in some embodiments, the contact may be virtually constant, as through an item installed on the user's desktop.

In this way, the merchant may push advertising data to the user without requiring that the user pull data from the merchant by actively visiting a merchant's webpage or store. In some embodiments, the merchant may provide a mechanism for the user to indicate that the user is interested in a particular type of promotion, and the widget, program, media player 44, banner advertisement 78, etc. installed at a location of the user may selectively receive customized promotional material to further improve the user's experience. As has been discussed above, in some embodiments of the invention, the widget, program, media player 44, banner advertisement, etc. need not be obtained from a web page, but may also be obtained by a second user from a first user's desktop.

In some embodiments, to best facilitate and assist users in inserting copies of the distributed item, the link 80 discussed above may provide a pull-down list or drop-down menu that provides a selection of potential install locations and/or installation types. The user may be provided differing instructions and or information for installation based on the selection of a particular location and/or type of installation of an embodiment of the media player 44, widget, program, banner advertisement 78, etc. from the pull-down list or drop-down menu. For example, different instructions may be provided for selected insertion on differing types of web pages, including MySpace®, Facebook®, blog pages, and other similar or different web pages. In addition, different instructions may be provided with a downloadable desktop installation, as has been discussed above.

Figure 18:
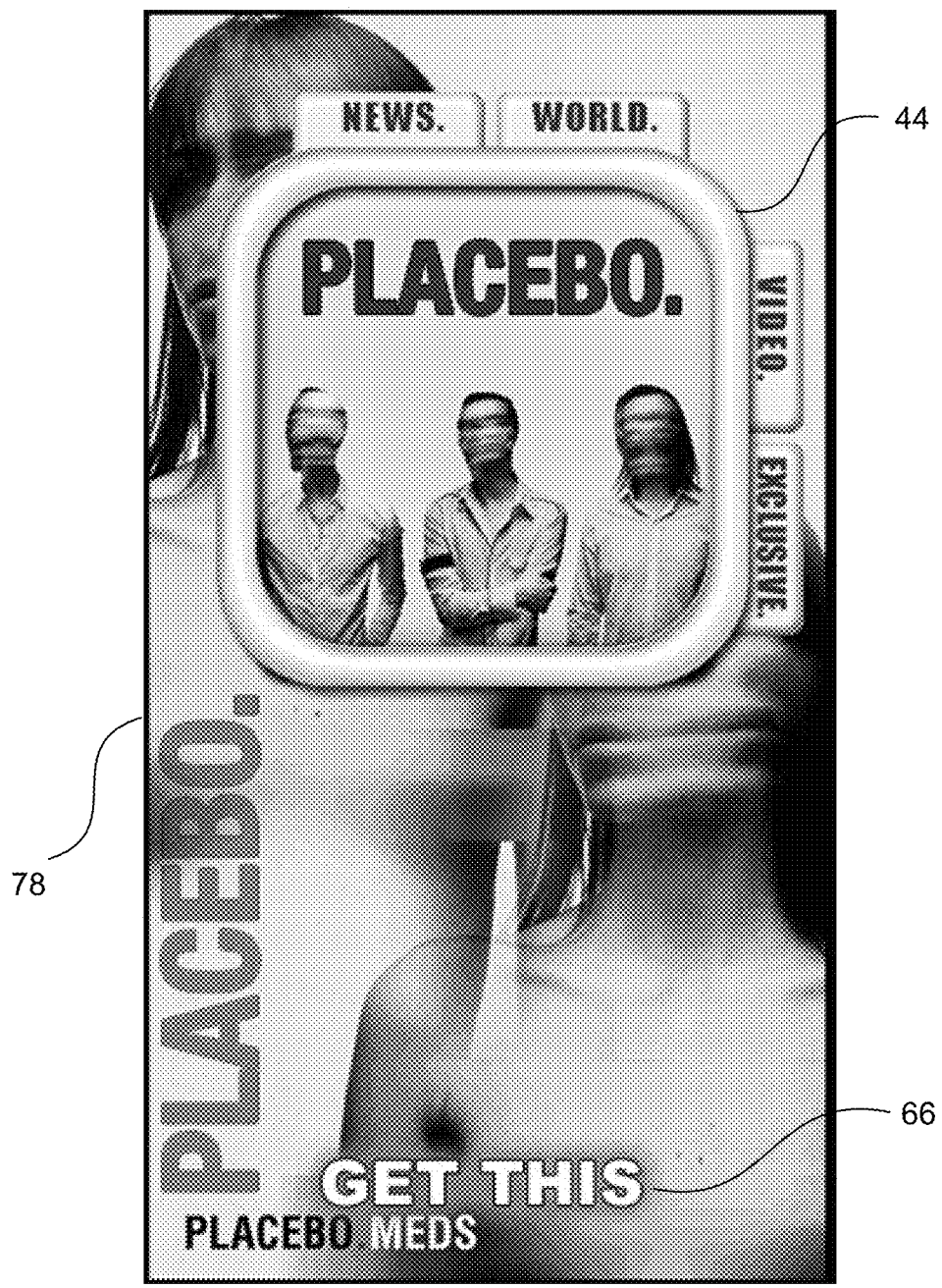
FIG. 18 illustrates a representative banner advertisement that includes a media player in accordance with embodiments of the present invention.

FIG. 18 illustrates one alternate embodiment of a banner advertisement 78 in accordance with the embodiments of the invention discussed herein. One of skill in the art will readily recognize that the banner advertisement 78 may be placed in any suitable location on a web page or computer desktop, as has been discussed herein. The embodiment of the banner advertisement 78 illustrated in FIG. 18 includes an displayed embodiment of the media player 44 and further displays an embodiment of the embed instance of player link 66. In the illustrated embodiment, the embed instance of player link 66 may be selected and other instances of the media player 44 and/or banner advertisement 78 may be obtained and distributed as has been previously discussed, without the full functionality of the media player 44 ever being accessed or displayed to the user. In addition, as the media player 44 is displayed in the banner advertisement 78 prior to any mouse-over event or selection of the banner advertisement by the user, the media player 44 may display or provide media to the user who visits the webpage, desktop, etc. where the banner advertisement 78 is located, and in some embodiments may do so without requiring any mouse-over or banner selection event.

Figure 19:
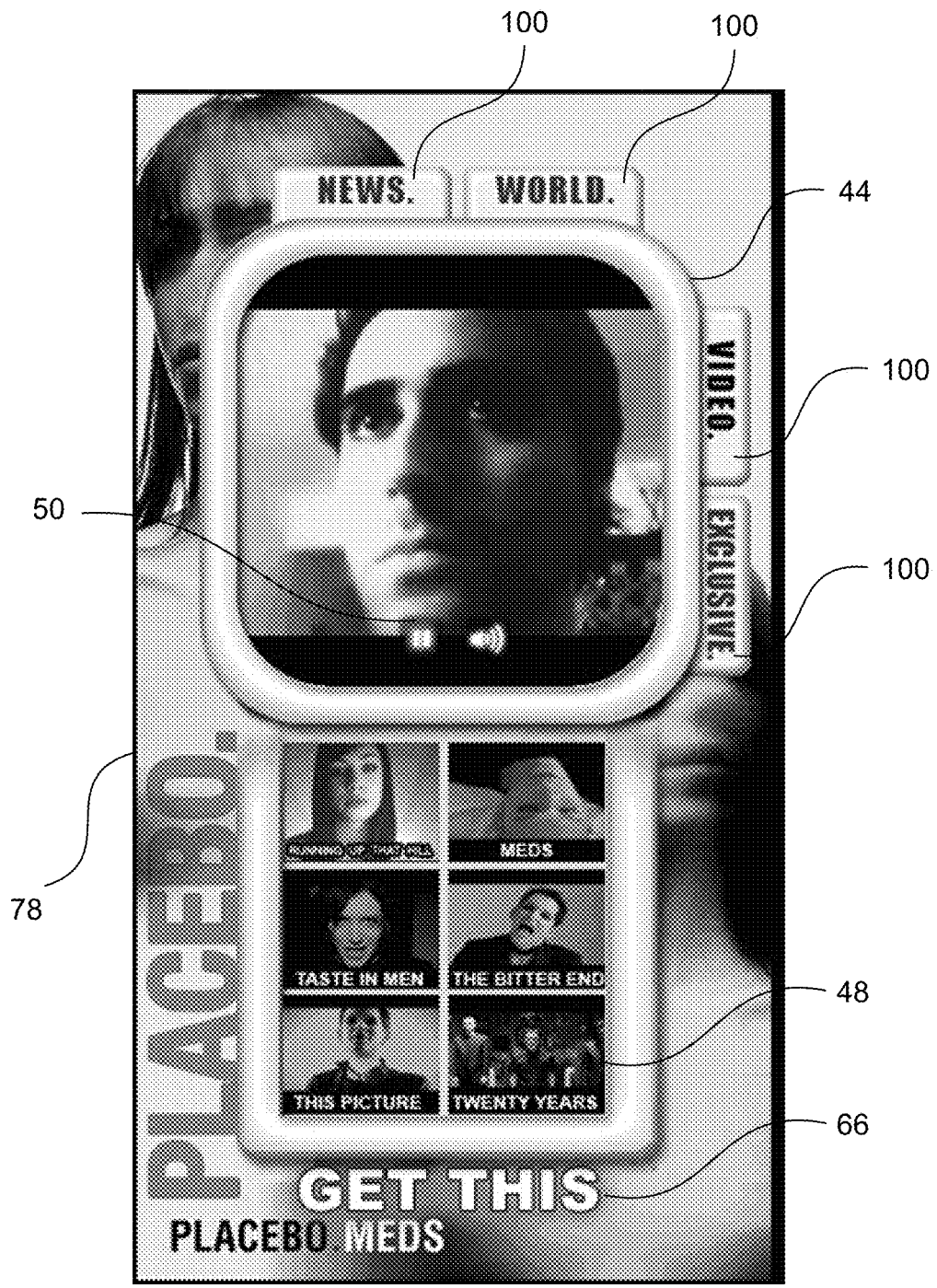
FIG. 19 shows the representative banner advertisement of FIG. 18 after a mouse-over event has activated features of the media player.

Upon a mouse-over event of the banner advertisement 78 or the media player 44, or alternatively upon selection (e.g., mouse-click) of the media player 44 and/or the banner advertisement 78, the display of the banner advertisement 78 and media player 44 may change to a display similar to that shown in FIG. 19. Alternatively, the display of FIG. 19 may be the initial display presented to the user. The display of FIG. 19 now includes an alternate embodiment of the media playlist 48, which embodiment displays the media items in the media playlist 48 as thumbnail icons for reference and selection by the user. As may be appreciated, the thumbnail icons may assist some users in making a selection of a media item for playing in the media player 44. The media player 44 of FIG. 19 also includes media controls 50, as has been discussed above, and continues to display the embed instance of player link 66 shown in FIG. 18.

This alternate embodiment of the media player 44 also includes a plurality of content links 100. The content links 100 serve as a mechanism to provide additional organization of media items accessible to the media player 44, and may also serve to provide access to one or more external links. As may be appreciated, access to external links may be useful for an advertiser or other sponsor of the media player 44 to provide linking to further information, to sales activities, or to other desirable locations. In the illustrated embodiment, the content links 100 shown include "News," "World," "Video," and "Exclusive." The display shown in FIG. 19 may be a display shown upon selection of the "Video" content link 100.

Figure 20:
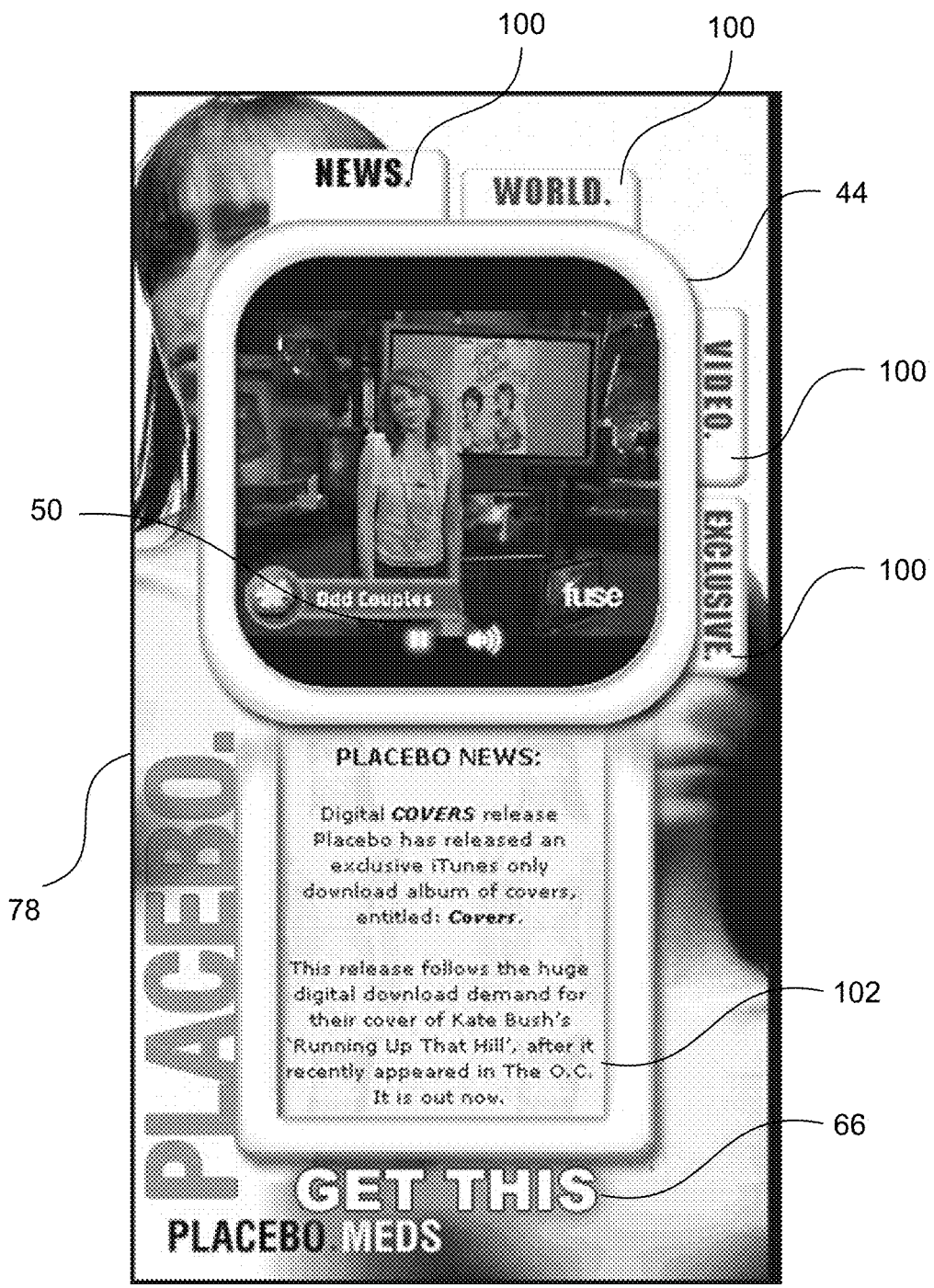
FIG. 20 illustrates features of the media player illustrated in FIG. 19.
Figure 21:
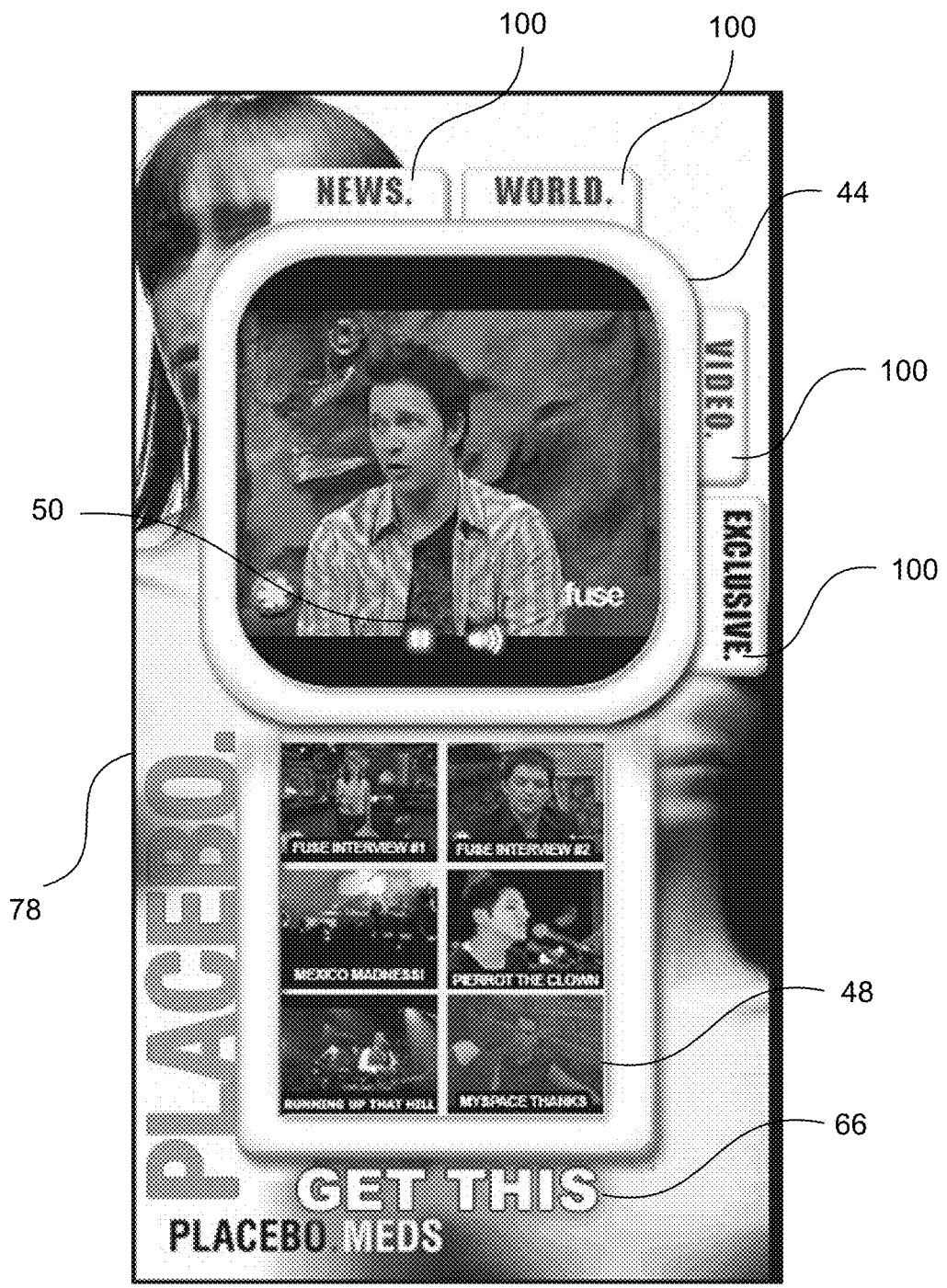
FIG. 21 illustrates features of the media player illustrated in FIG. 19.

FIG. 20 illustrates a view of the media player 44 that may be displayed upon selection of the "News" content link 100. In this view, the media playlist 48 has been replaced with an information box 102 containing text media selected by the content owner for display by the media player 44. In addition, the media player 44 may begin displaying an associated media item in the media display area 46 upon selection of the "News" content link 100. As may be appreciated, the content links 100 may also include any other subdivision of media or information, including categorization of different media playlists 48. For example, FIG. 21 shows a view of the media player 44 that may be displayed upon selection of the "Exclusive" content link 100. In this view, an alternate media playlist 48 has been displayed that is different from the media playlist 48 displayed on selection of the "Video" content link 100.

Figure 22:
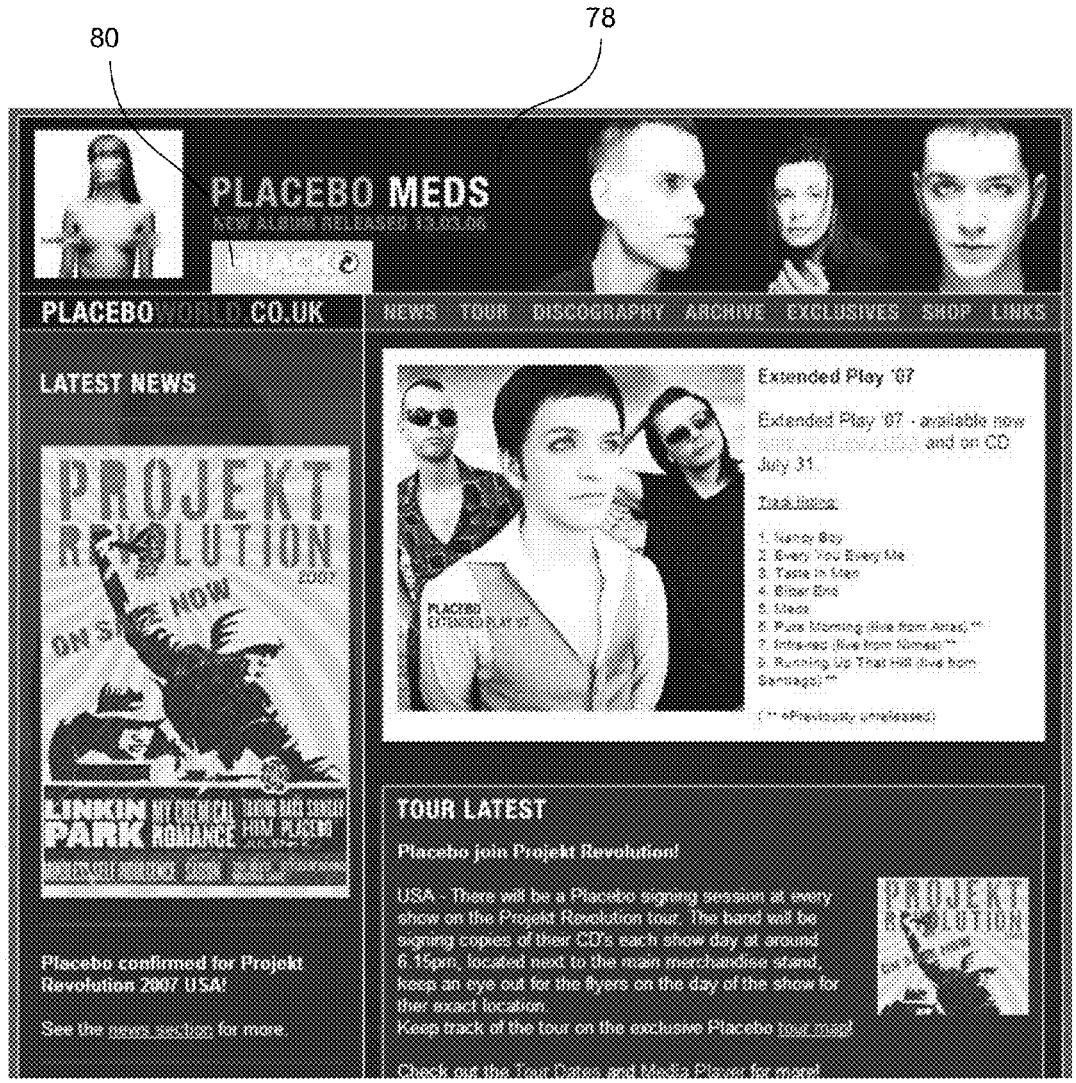
FIG. 22 illustrates an alternative banner advertisement included in a web page in accordance with embodiments of the present invention.
Figure 23:
FIG. 23 illustrates the banner advertisement of FIG. 22 after a mouse-over event has caused the display of a media player in accordance with embodiments of the present invention.
Figure 24:
FIG. 24 illustrates the media player of FIG. 23 after an additional mouse-over event has activated additional features of the media player.

While the banner advertisement 78 displayed in FIGS. 18-21 may be configured to always display some form of the media player 44 and may be inserted into any appropriate location in a webpage or desktop as discussed above, an alternate embodiment of the banner advertisement 78 is shown in FIGS. 22-24 as it is embedded in a hypothetical webpage display 74. FIG. 22 shows the banner advertisement 78 as it may be displayed prior to any activation of the media player 44 by mouse-over or selection event on the banner advertisement 78. As may be seen, the banner advertisement 78 is inserted near the top of the webpage display 74; however, those of skill in the art will readily appreciate that the location may be varied as discussed herein. In the banner advertisement 78 shown in FIG. 22, the link 80 to obtain a copy of the media player 44 is visible. The link 80 to obtain a copy of the media player 44 serves multiple purposes in such a situation. First, it serves as a notice to users familiar with the functionality of such banner advertisements 78 that additional media content and a media player 44 is obtainable through the banner advertisement 78. Second, it serves as a visual cue to users not familiar with the functionality of such banner advertisements to excite the users' curiosity and perhaps cause the users to perform a mouse-over event that causes activation of the functionality. Third, it serves as a mechanism for obtaining a copy of the media player 44, banner advertisement 78, widget, program, etc. as discussed above.

Prior to the occurrence of a mouse-over or mouse-click event, the embodiment of the banner advertisement 78 shown in FIG. 22 may not include a media display area 46 or media player 44. Upon such event, the banner advertisement 78 may change to display the media player 44 as in FIG. 24, or it may change to display only a portion of the media player 44 as in FIG. 23. If only a portion of the media player 44 is displayed, a second mouse-over event or mouse-click event on the portion of the media player 44 may change the display to the full media player 44 as in FIG. 24. As may be appreciated by reference to FIGS. 23 and 24, once the media player 44 is partially or fully open, it may remain open until actively closed by selecting a link to close the media player 44. Alternatively, the media player may close once the user moves the mouse to a portion of the web page (or desktop) not over either the banner advertisement 78 or the media player 44. As may be appreciated, the media player 44 from the banner advertisement 78 in FIGS. 22-24 may have the full functionality discussed with respect to any of the above Figures, such as FIGS. 18-21.

Figure 25:
FIG. 25 shows an alternative banner advertisement included in a web page in accordance with embodiments of the present invention.

FIGS. 25-30 display an alternate banner advertisement 78 and media player 44 illustrating features of the embodiments of the invention. In FIG. 25, an embodiment of a banner advertisement 78 is shown inserted near the top right side of the webpage display 74. This embodiment of the banner advertisement 78 has no links or particular visual clues to identify that it includes features of the embodiments of the invention discussed herein prior to activation of the additional features via mouse-over or mouse-click event as discussed herein. After such an event, the display of the banner advertisement 78 may enlarge (either displacing or covering up additional webpage elements) to show any included features of the media player 44. The features shown in FIGS. 26-28 include the media display area 46, the media playlist 48, the login link 52, the embed instance of player link 66, and one or more obtain media links 104. The included features may vary depending on the desired and permitted functionality of the media player 44 and may further depend on the desires of the content author(s) or entity controlling the media player 44.

Figure 26:
FIG. 26 illustrates the banner advertisement of FIG. 25 after a mouse-over event has caused the display of a media player in accordance with embodiments of the present invention.
Figure 27:
FIG. 27 illustrates the media player of FIG. 26 when a different media item of the media player has been selected.
Figure 28:
FIG. 28 illustrates the media player of FIG. 27 after an additional mouse-over event.

As may be appreciated by comparing FIGS. 26-28, these Figures illustrate an alternate mechanism for displaying the media display area 46 and the media playlist 48. In particular, it may be seen that selecting a particular item from the media playlist 48 for playing (in this case video media items) may cause the selected item from the media playlist 48 to expand to show the media display area 46 at the location of the media item on the media playlist 48, thus compressing the media display area 46 into the media playlist 48 for the previously-selected media item. As may also be appreciated by comparing FIGS. 27 and 28, the media controls 50 and the obtain media link 104 may be only intermittently displayed, such as upon the occurrence of a mouse-over event over the particular media item being displayed in the media display area 46.

In some embodiments, whether the obtain media link 104 is displayed for a particular media item may depend on the protection desired for the media item. For example, a copyright owner may desire free distribution of a particular media item to others' media players 44 and playlists 48, but may not desire distribution of other media items outside of the content of the specific embodiment of the media player 44. In such instances, the copyright owner may allow display of the obtain media link 104 for the particular media item but not for the other media items. In this fashion, embodiments of the media player 44 and banner advertisement 78 permit enhanced controlled distribution not only of the media player 44 and banner advertisement 78, but of individual media items as well.

Figure 29:
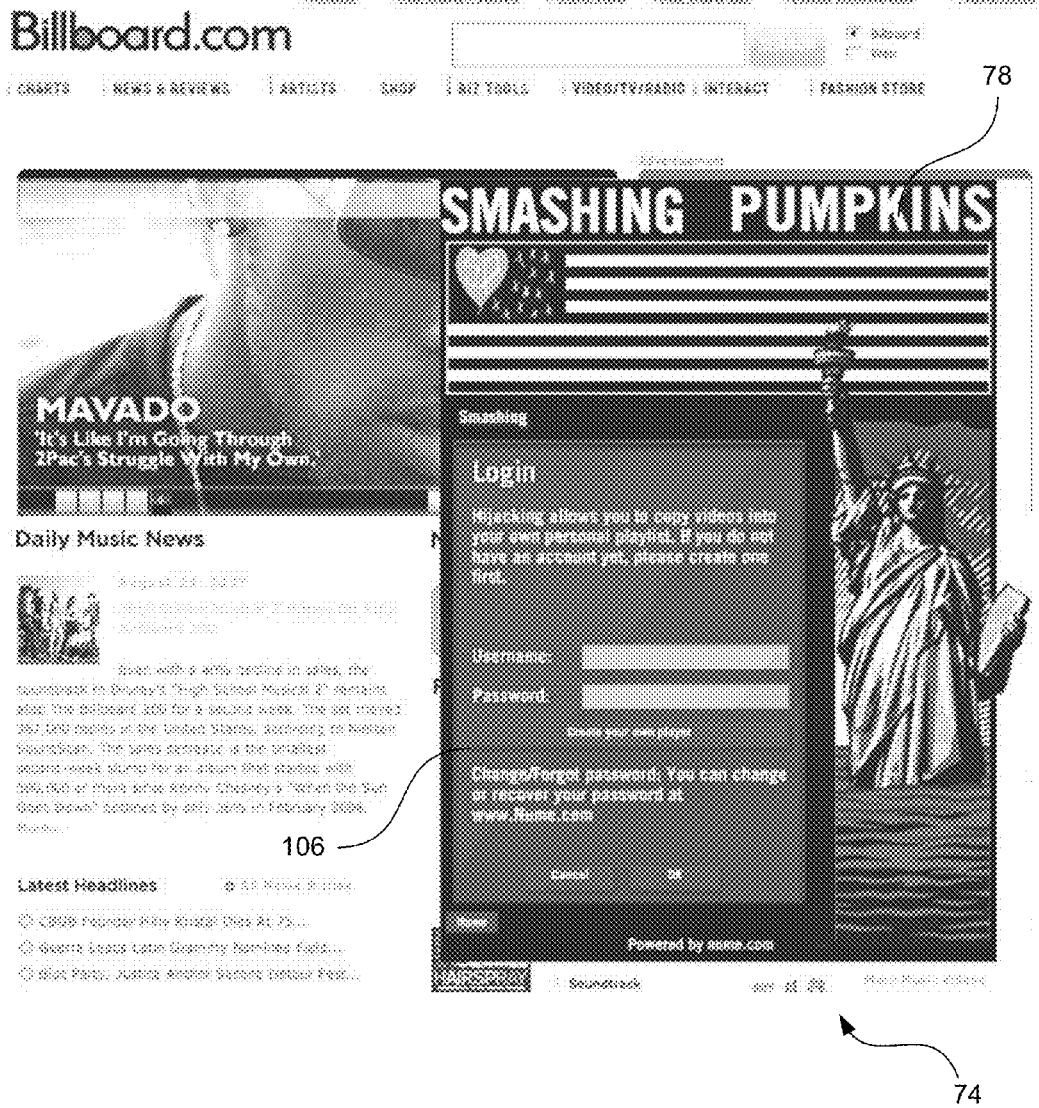
FIG. 29 illustrates the media player of FIGS. 26-28 after an obtain media link has been selected.

To further illustrate the functionality of the obtain media link 104, reference is made to FIG. 29. As may be appreciated from the description herein, selection of the obtain media link 104 permits a user to insert a copy of a media item into the user's own playlist 48 and media player 44. In many instances, an actual copying of the media item from one location to another does not occur. Instead, in those instances, a reference to a URL where the media item is located may be utilized instead to insert the media item from one playlist 48 to another. This is advantageous for all the reasons discussed herein. In some other instances, an actual copy of the media item may be obtained and inserted into the user's playlist 48 and media player 44. This may be particularly advantageous for a desktop widget or desktop program form of the media player 44 as discussed herein, as it is known that not all computers have continuous Internet or other network access at all times, and such obtaining of a full copy of the media item may permit access to the media item at a time when Internet or other network access is limited or non-existent. If a full copy of the media item is obtained, selection of the obtain media link 104 may simply prompt the user to designate a location for saving the copy of the media item.

If, however, the media item is to be obtained as a copy of the URL reference to the location of the media item, the media player 44 and/or banner advertisement 78 display may change as is illustrated in FIG. 29 upon selection of the obtain media link 104. The changed display includes a obtain media login page 106. At the obtain media login page 106, the user may be prompted to input his or her username and password to access the user's own playlist 48. After logging in, the media item may be automatically added to the user's playlist 48, or the user may be prompted to confirm that he or she wishes to add the media item to the user's playlist 48. Additionally and alternatively, the user may be prompted to select a location within the user's playlist 48 in which to insert the media item. As may be appreciated, the user may elect to cancel the addition at any time, and may further access or modify the user's playlist 48 in all the manners discussed herein.

Figure 30:
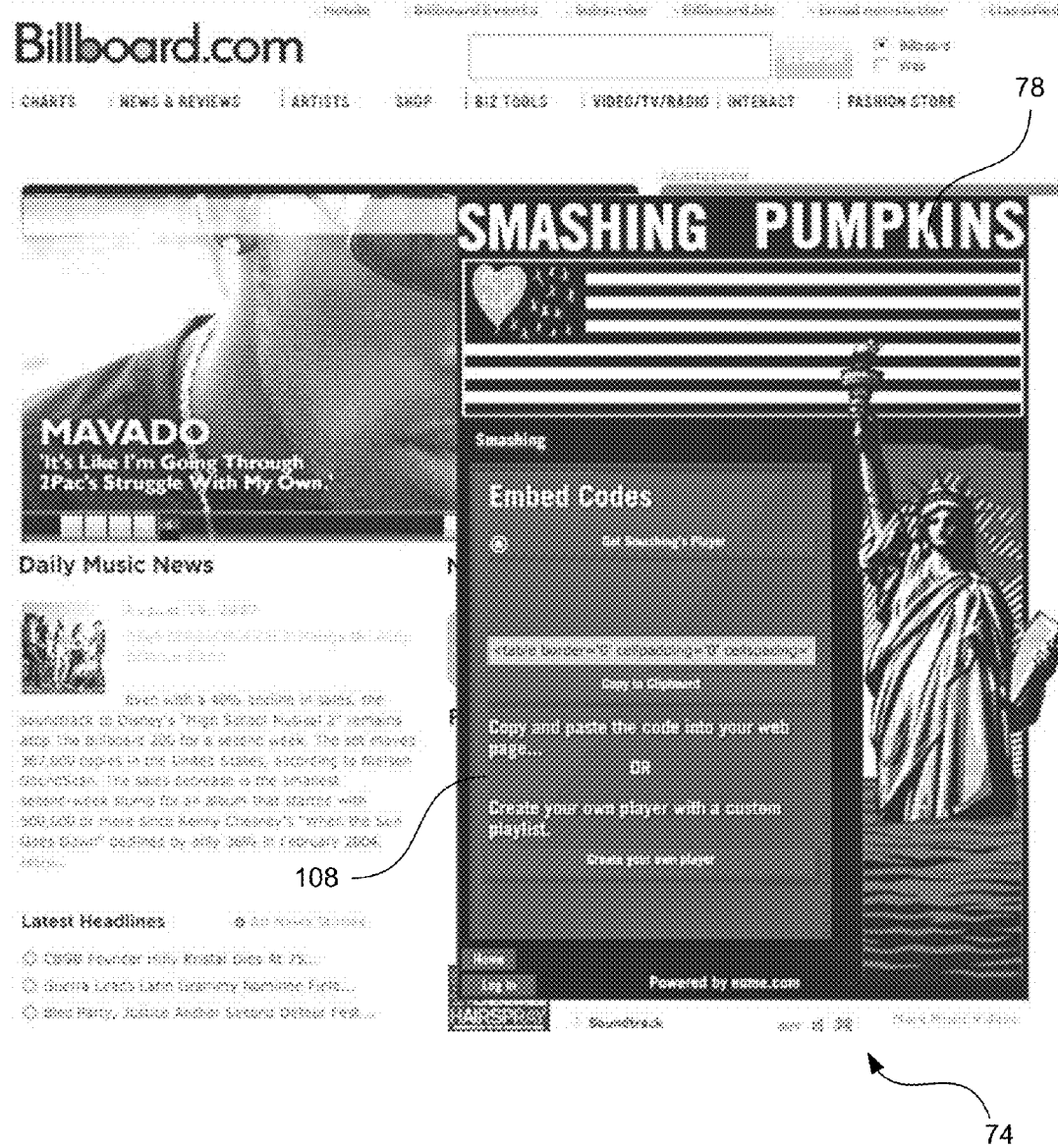
FIG. 30 illustrates the media player of FIGS. 26-28 after an embed instance of the media player link has been selected.

FIG. 30 shows an alternate display that may be shown upon selection of the embed instance of player link 66 shown in FIGS. 26-28. Upon selection of the embed instance of player link 66, the display of the banner advertisement 78 and/or media player 44 may change or be replaced to show an embed instance page 108. As may be appreciated, the embed instance page 108 may include HTML or other code to permit embedding of an instance of the media player 44 and/or banner advertisement 78 in another web page, it may include links 80 to obtain copies of the media player 44, and/or it may include drop-down menus or the like to specify the format of the obtained copy of the media player 44 and/or banner advertisement 78, as discussed herein.

As may be appreciated by reviewing FIGS. 3-16 and 17-30, the visual appearance of the media player 44 (and/or banner advertisement 78) may take many different forms and may include various functionalities. The particular visual appearance of the media player 44 is commonly known in the art as a "skin." Because of the unique functionality of the embodiments of the media player 44 described herein and the remote hosting capability of the embodiments of the media player 44 disclosed herein, it is possible for a playlist owner to modify not only the playlist 48 and the media items contained in the playlist 48, but to also modify the skin of the media player 44. If a playlist author modifies the skin or visual appearance and functionality of the author's media player 44, such changes and modifications may be automatically distributed to all other instances of the media player 44, wherever they are inserted, whether in other web pages or on other user's desktops. Thus, at least some embodiments of the invention are "skinnable on the fly" in that the playlist author may elect to modify the skin of all instances of the author's media player 44 (and/or banner advertisement 78) from any instance of the media player 44 that the playlist author encounters. Additionally, as may be appreciated, the playlist author may do this without even encountering an instance of his or her own playlist 48, media player 44, or banner advertisement 78, but may do it through other users' instances, in the manners described herein. In at least some embodiments of the invention, a first user may be permitted to obtain a skin from another user's instance of the media player 44 that the first user encounters on the web in the same or a similar manner to that described for the obtaining of media items.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method of accessing media comprising:
using a first network-connected computer device to provide a first instance of a media player on a first webpage, the first instance of the media player comprising media of a first user for display through the first instance of the media player;
using the first network-connected computer device to provide a second instance of a media player on a second webpage, the second instance of the media player comprising media of a second user for display through the second instance of the media player;
allowing a second network-connected computer device to access the first instance of the media player through the second instance of the media player, wherein allowing a second network-connected computer device to access the first instance of the media player through the second instance of the media player comprises:
receiving login information at the second instance of the media player using identifying information associated with the first instance of the media player; and
replacing the media of the second user of the second instance of the media player with the media of the first user.

2. The method of claim 1, wherein allowing a second network-connected computer device to access the first instance of the media player through the second instance of the media player further comprises:
receiving an action comprising logging out of the second instance of the media player; and
restoring the media of the second user to the second instance of the media player.

3. The method of claim 1, wherein the replacing the media of the second user does not affect the second instance of the media player except as it is being viewed by a party logged in to the second instance of the media player using the identifying information associated with the first instance of the media player.

4. The method of claim 1, further comprising sharing and distributing the media of the second user by:
permitting a party logging in to the second instance of the media player using identifying information associated with the first instance of the media player to access and copy the media of the second user; and
adding the copied media of the second user to the media of the first user for display on the first instance of the media player.

5. The method of claim 1, wherein the webpage containing the second instance of the media player is not changed, outside of the second instance of the media player, upon receiving login information using the identifying information associated with the first instance of the media player.

6. The method of claim 1, wherein the media of the first user is remotely hosted from the first and second instances of the media player and is streamed to the first and second media players for playing on demand.

7. The method of claim 1 wherein the first and second instances of the media player are remotely hosted from the first and second webpages on which they are located, further comprising:
inserting a third instance of a media player in a third webpage, the third instance of the media player being a copy of the first instance of the media player.

8. The method of claim 7, wherein the step of inserting the third instance of the media player in the third webpage comprises:
providing hypertext markup language (HTML) code representing the first instance of the media player at one of:
the first instance of the media player; and
the second instance of the media player when a party is logged in to the second instance of the media player using identifying information associated with the first instance of the media player;
copying the HTML code; and
inserting the HTML code into the webpage of the third instance of the media player.

9. The method of claim 7, whereby if the media of the first user is changed, the third instance of the media player no longer displays the original media of the first user but displays the changed media of the first user.

10. A non-transitory computer-readable medium containing computer program code for performing a method of accessing media, the method comprising:
providing a first instance of a media player on a first webpage, the first instance of the media player comprising media of a first user for display through the first instance of the media player;

providing a second instance of a media player on a second webpage, the second instance of the media player comprising media of a second user for display through the second instance of the media player;

accessing the first instance of the media player through the second instance of the media player, wherein the step of accessing the first instance of the media player through the second instance of the media player comprises:

logging in to the second instance of the media player using identifying information associated with the first instance of the media player; and replacing the media of the second user of the second instance of the media player with the media of the first user.

11. The non-transitory computer-readable medium of claim 10, wherein the step of accessing the first instance of the media player through the second instance of the media player further comprises:

logging out of the second instance of the media player; and restoring the media of the second user to the second instance of the media player.

12. The non-transitory computer-readable medium of claim 10, wherein replacing the media of the second user does not affect the second instance of the media player except as it is being viewed by a party logged in to the second instance of the media player using the identifying information associated with the first instance of the media player.

13. The non-transitory computer-readable medium of claim 10, wherein the method further comprises sharing and distributing the media of the second user by;

permitting a party logging in to the second instance of the media player using identifying information associated with the first instance of the media player to access and copy the media of the second user; and adding the copied media of the second user to the media of the first user for display on the first instance of the media player.

14. The non-transitory computer-readable medium of claim 10, wherein the webpage containing the second instance of the media player is not changed, outside of the second instance of the media player, upon logging in using the identifying information associated with the first instance of the media player.

15. The non-transitory computer-readable medium of claim 10, wherein the media of the first user is remotely hosted from the first and second instances of the media player and is streamed to the first and second media players for playing on demand.

16. The non-transitory computer-readable medium of claim 10 wherein the first and second instances of the media player are remotely hosted from the first and second webpages on which they are located, the method further comprising:

inserting a third instance of a media player in a third webpage, the third instance of the media player being a copy of the first instance of the media player.

17. The non-transitory computer-readable medium of claim 16, wherein the step of inserting the third instance of the media player in the third webpage comprises:

providing hypertext markup language (HTML) code representing the first instance of the media player at one of:
the first instance of the media player; and
the second instance of the media player when a party is logged in to the second instance of the media player using identifying information associated with the first instance of the media player;

copying the HTML code; and inserting the HTML code into the webpage of the third instance of the media player.

18. The non-transitory computer-readable medium of claim 16, whereby if the media of the first user is changed, the third instance of the media player no longer displays the original media of the first user but displays the changed media of the first user.

19. A non-transitory computer-readable medium containing computer program code for performing a method of accessing media, the method comprising:

providing a first instance of a media player on a first webpage, the first instance of the media player comprising media of a first user for display through the first instance of the media player;

providing a second instance of a media player on a second webpage, the second instance of the media player comprising media of a second user for display through the second instance of the media player;

permitting a party to access the first instance of the media player through the second instance of the media player, wherein accessing the first instance of the media player through the second instance of the media player comprises:

logging in to the second instance of the media player using identifying information associated with the first instance of the media player; and replacing the media of the second user of the second instance of the media player with the media of the first user.

20. The non-transitory computer-readable medium of claim 19, wherein the method further comprises sharing and distributing the media of the second user by:

permitting the party logging in to the second instance of the media player using identifying information associated with the first instance of the media player to access and copy the media of the second user; and adding the copied media of the second user to the media of the first user for display on the first instance of the media player.

* * * * *